(12) United States Patent
Oya et al.

(10) Patent No.: US 8,703,252 B2
(45) Date of Patent: Apr. 22, 2014

(54) MULTI-LAYER STRETCHED FILM

(75) Inventors: Taro Oya, Anpachi-gun (JP);
Mitsumasa Ono, Anpachi-gun (JP);
Tetsuo Yoshida, Anpachi-gun (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 13/515,709

(22) PCT Filed: Dec. 15, 2010

(86) PCT No.: PCT/JP2010/073065
§ 371 (c)(1),
(2), (4) Date: Jun. 13, 2012

(87) PCT Pub. No.: WO2011/074701
PCT Pub. Date: Jun. 23, 2011

(65) Prior Publication Data
US 2012/0249935 A1    Oct. 4, 2012

(30) Foreign Application Priority Data

Dec. 18, 2009 (JP) .................................. 2009-287757
Dec. 18, 2009 (JP) .................................. 2009-287758
Jun. 30, 2010 (JP) .................................. 2010-149886

(51) Int. Cl.
*C09K 19/00* (2006.01)

(52) U.S. Cl.
USPC ........... 428/1.1; 428/1.3; 428/1.31; 428/1.33; 349/96; 349/117; 359/485.01; 359/485.03; 528/176; 528/209

(58) Field of Classification Search
USPC ................. 428/1.1, 1.3, 1.31, 1.33, 1.5, 1.54, 428/847.3, 847.4; 349/96, 117; 359/485.01, 359/485.03; 528/176, 209
See application file for complete search history.

(56) References Cited

U.S. PATENT DOCUMENTS

| 5,486,949 A | 1/1996 | Schrenk et al. |
| 5,738,803 A | 4/1998 | Shepherd et al. |

(Continued)

FOREIGN PATENT DOCUMENTS

| JP | 04-268505 A | 9/1992 |
| JP | 9-506837 A | 7/1997 |

(Continued)

OTHER PUBLICATIONS

Japanese Office Action dated Aug. 30, 2011 issued in Japanese Patent Application No. 2010-149886.

(Continued)

*Primary Examiner* — Gwendolyn Blackwell
*Assistant Examiner* — Ruiyun Zhang
(74) *Attorney, Agent, or Firm* — Sughrue Mion, PLLC

(57) ABSTRACT

A multi-layer stretched film has 251 or more alternating layers which consist of first layers and second layers, wherein the first layers are made of a polyester which contains (i) 5 to 50 mol % of a naphthoic acid component as a dicarboxylic acid component and (ii) a diol having an alkylene group with 2 to 10 carbon atoms as a diol component; and the second layers are made of a thermoplastic resin having an average refractive index of 1.50 to 1.60 and differences in refractive index among a uniaxial stretching direction, a direction orthogonal to the uniaxial stretching direction and a film thickness direction of 0.05 or less before and after stretching, and the film has specific reflectance characteristics for a P polarization component and an S polarization component.

23 Claims, 3 Drawing Sheets

(56) References Cited

U.S. PATENT DOCUMENTS

| | | |
|---|---|---|
| 5,828,488 A | 10/1998 | Ouderkirk et al. |
| 5,863,622 A | 1/1999 | Jester |
| 6,368,699 B1 | 4/2002 | Gilbert et al. |
| 6,677,031 B1 | 1/2004 | Murooka et al. |
| 6,804,058 B1 | 10/2004 | Ouderkirk et al. |
| 2001/0008464 A1 | 7/2001 | Ouderkirk et al. |
| 2001/0008700 A1 | 7/2001 | Jonza |
| 2002/0015836 A1 | 2/2002 | Jonza et al. |
| 2002/0064671 A1 | 5/2002 | Hebrink et al. |
| 2004/0086690 A1 | 5/2004 | Hebrink et al. |
| 2004/0125450 A1 | 7/2004 | Hebrink et al. |
| 2005/0024726 A1 | 2/2005 | Ouderkirk et al. |
| 2005/0244646 A1 | 11/2005 | Hebrink et al. |
| 2006/0221446 A1 | 10/2006 | Hebrink et al. |
| 2007/0091230 A1 | 4/2007 | Ouderkirk et al. |
| 2007/0098970 A1 | 5/2007 | Hebrink et al. |
| 2007/0121034 A1 | 5/2007 | Ouderkirk et al. |
| 2007/0264447 A1* | 11/2007 | Oya et al. ............ 428/1.31 |
| 2008/0003419 A1 | 1/2008 | Hebrink et al. |
| 2008/0113113 A1* | 5/2008 | Moon et al. ............ 428/1.1 |
| 2009/0062504 A1 | 3/2009 | Hebrink et al. |
| 2009/0079909 A1 | 3/2009 | Ouderkirk et al. |
| 2010/0190037 A1* | 7/2010 | Kinoshita et al. ............ 428/837 |

FOREIGN PATENT DOCUMENTS

| | | |
|---|---|---|
| JP | 2000-502816 A | 3/2000 |
| JP | 2001-505670 A | 4/2001 |
| JP | 2002-509043 A | 3/2002 |
| JP | 2004-46216 A | 2/2004 |
| JP | 2006-512619 A | 4/2006 |
| JP | 2008-52294 A | 3/2008 |
| JP | 2008-162289 A | 7/2008 |
| JP | 2011-126181 A | 6/2011 |
| WO | 95/17303 A1 | 6/1995 |
| WO | 01/47711 A1 | 7/2001 |
| WO | WO 2008153188 A1 * | 12/2008 |

OTHER PUBLICATIONS

Japanese Office Action dated Mar. 27, 2012 issued in Japanese Patent Application No. 2012-028381.

International Preliminary Report on Patentability issued on Jul. 10, 2012.

International Search Report for PCT/JP2010/073065 dated Apr. 12, 2011, English Translation.

* cited by examiner

MULTI-LAYER STRETCHED FILM

CROSS REFERENCE TO RELATED APPLICATIONS

This application is a National Stage of International Application No. PCT/JP2010/073065 filed Dec. 15, 2010, the contents of which are incorporated herein by reference in their entirety.

TECHNICAL FIELD

The present invention relates to a multi-layer stretched film which selectively reflects a certain polarization component and selectively transmits a polarization component in a direction perpendicular to the above polarization component. More specifically, it relates to a multi-layer stretched film which is excellent in polarization performance that it selectively reflects a certain polarization component and selectively transmits a polarization component in a direction perpendicular to the above polarization component and eliminates a hue shift of transmitted polarization without producing the partial reflection of diagonally incident light.

BACKGROUND ART

An alternating multi-layer film comprising layers having a low refractive index and layers having a high refractive index can be used as an optical interference film which selectively reflects or transmits light having a specific wavelength due to structural optical interference between layers. This multi-layer film can obtain as high reflectance as that of a film comprising a metal by gradually changing its film thickness or by laminating together films having different reflection peaks and can be used as a film having metallic luster or a reflection mirror. Further, when this multi-layer film is stretched only in one direction, it becomes a polarization reflection film which reflects only a specific polarization component. It is known that when it is used in a liquid crystal display, it can be used as a brightness improving film for liquid crystal displays.

In general, a phenomenon such as "increased reflection" that light having a specific wavelength is reflected is seen in a multi-layer film consisting of layers having a thickness of 0.05 to 0.5 µm and different refractive indices according to the difference in refractive index between one type of layers and the other type of layers, film thickness and the number of layers. The reflection wavelength is generally represented by the following equation.

$$\lambda = 2(n_1 \times d_1 + n_2 \times d_2)$$

(In the above equation, $\lambda$ is a reflection wavelength (nm), $n_1$ and $n_2$ are the refractive indices of respective layers, and $d_1$ and $d_2$ are the thicknesses (nm) of the respective layers.)

For example, as shown in Patent Document 1, when a resin having a positive stress-optical coefficient is used in one type of layers, the refractive index of the layers is made birefringent by stretching the layers in a uniaxial direction so as to provide anisotropy to the layers, thereby expanding the difference in refractive index between layers in a stretching direction within the film plane and reducing the difference in refractive index between layers in a direction orthogonal to the stretching direction within the film plane. As a result, it is possible to reflect only a specific polarization component.

Making use of this principle, a reflection polarization film which reflects polarization in one direction and transmits polarization in a direction orthogonal to the above direction can be designed, and the desired birefringence of the film is represented by the following formulas.

$$n_{1X} > n_{2X}, n_{1Y} = n_{2Y}$$

(In the above formulas, $n_{1X}$ and $n_{2X}$ are the refractive indices in the stretching direction of respective layers, and $n_{1Y}$ and $n_{2Y}$ are the refractive indices in a direction orthogonal to the stretching direction of the respective layers.)

Patent Document 2 and Patent Document 3 disclose a multi-layer film in which polyethylene-2,6-naphthalene dicarboxylate (may be referred to as "2,6-PEN" hereinafter) is used in layers having a high refractive index and a thermoplastic elastomer or PEN comprising 30 mol % of isophthalic acid is used in layers having a low refractive index. These references teach a reflection polarization film which reflects only specific polarization by using a resin having a positive stress-optical coefficient in one type of layers and a resin having an extremely small stress-optical coefficient (extremely rare development of birefringence by stretching) in the other type of layers.

However, when 2,6-PEN is used in the layers having a high refractive index, there is produced a difference between the refractive index in a direction (Y direction) orthogonal to the stretching direction and the refractive index in the thickness direction (Z direction) of the film after stretching in the layers. Therefore, when the draw ratio is to be increased to expand the difference in refractive index between layers in the stretching direction (X direction) so as to enhance polarization performance, the difference in refractive index between layers in the Z direction is also expanded. Therefore, there arises a problem that a hue shift of transmitted light becomes larger due to the partial reflection of diagonally incident light.

(Patent Document 1) JP-A 04-268505
(Patent Document 2) JP-A 9-506837
(Patent Document 3) WO01/47711

DISCLOSURE OF THE INVENTION

It is an object of the present invention to provide a multi-layer film which solves the above problems of a prior art multi-layer film, has higher polarization performance than in the prior art and a reflection polarization function and with which a hue shift of transmitted polarization from diagonally incident light caused by the diagonal angle of incidence is not seen.

The present invention is based on the following finding. That is, polyethylene-2,6-naphthalene dicarboxylate which has been used as the resin of first layers constituting high-refractive index layers is characterized in that its refractive index is increased in a stretching direction (X direction) by uniaxial stretching but rarely changes before and after stretching in a Y direction and drops in a Z direction. Therefore, when polarization performance is to be enhanced by increasing the difference in refractive index between layers in the stretching direction (X direction) by raising the draw ratio, the difference in refractive index between layers in the Z direction becomes large. When the refractive indices of layers in the Z direction after stretching are to be made equal to each other, the difference in refractive index between layers in the Y direction becomes large. Therefore, it is difficult to obtain the improvement of polarization performance and the elimination of a hue shift of transmitted polarization from diagonally incident light at the same time.

The inventors of the present invention found that when a polyester having a high refractive index containing a 6,6'-(alkylenedioxy)di-2-naphthoic acid component is used as the resin of the first layers constituting the high-refractive index layers in place of polyethylene-2,6-naphthalene dicarboxylate, the difference in refractive index between the X direction and the Y direction of the first layers after uniaxial stretching can be made large. As a result, they found that polarization performance is improved and the difference in refractive index between layers in both the Y and Z directions can be made small.

Based on these findings, the inventors of the present invention found that it is possible to obtain the improvement of polarization performance and the elimination of a hue shift of transmitted polarization caused by the diagonal angle of incidence at the same time. The present invention was accomplished based on this finding.

That is, an object of the present invention is attained by the following inventions.

1. A multi-layer stretched film comprising 251 or more alternating layers which consist of first layers and second layers, wherein
   1) the first layers are layers having a thickness of 0.01 to 0.5 μm and made of a polyester comprising a dicarboxylic acid component and a diol component:
      (i) the dicarboxylic acid component contains 5 to 50 mol % of a component represented by the following formula (A) and 50 to 95 mol % of a component represented by the following formula (B)

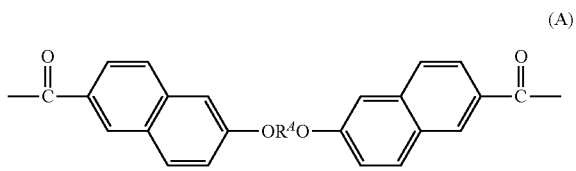

(A)

(In the above formula (A), $R^4$ is an alkylene group having 2 to 10 carbon atoms.)

(B)

(In the above formula (B), $R^B$ is a phenylene group or naphthalenediyl group.); and
      (ii) the diol component contains 90 to 100 mol % of a component represented by the following formula (C):

—O—$R^C$—O—  (C)

(In the above formula (C), $R^C$ is an alkylene group having 2 to 10 carbon atoms.); and
   the second layers are layers having a thickness of 0.01 to 0.5 μm and made of a thermoplastic resin having an average refractive index of 1.50 to 1.60 and differences in refractive index among a unidirectional stretching direction (X direction), a direction (Y direction) orthogonal to the uniaxial stretching direction within the film plane and a film thickness direction (Z direction) of 0.05 or less respectively, before and after stretching;
   2) the average reflectances at a wavelength of 400 to 800 nm for polarization incident at angles of 0° and 50° of a polarization component parallel to the incidence plane including the X direction with the film plane as a reflection plane are 90% or more, respectively;
   3) the average reflectances at a wavelength of 400 to 800 nm for polarization incident at angles of 0° and 50° of a polarization component perpendicular to the incidence plane including the X direction with the film plane as a reflection plane are 15% or less respectively; and
   4) the ratio of the thickness of the maximum layer to the thickness of the minimum layer in the first layers and the second layers is 2.0 to 5.0 respectively.

2. The multi-layer stretched film in the above paragraph 1, wherein the acid component represented by the formula (A) is represented by the following formula (A-1).

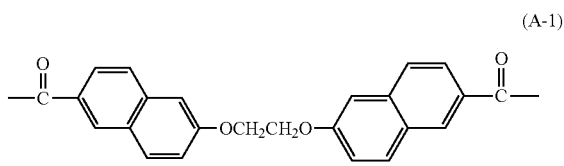

(A-1)

3. The multi-layer stretched film in the above paragraph 1 or 2, wherein the thermoplastic resin for forming the second layers is a polyester comprising as the main component an ethylene terephthalate component which contains isophthalic acid or 2,6-naphthalenedicarboxylic acid.

4. The multi-layer stretched film in any one of the above paragraphs 1 to 3, wherein the difference in refractive index in the X direction between the first layers and the second layers is 0.10 to 0.45.

5. The multi-layer stretched film in any one of the above paragraphs 1 to 4, wherein the difference in refractive index in the Y direction between the first layers and the second layers and the difference in refractive index in the Z direction between the first layers and the second layers are 0.05 or less respectively.

6. The multi-layer stretched film in any one of the above paragraphs 1 to 5, wherein the hue changes Δx and Δy represented by the following equations (1) and (2) of a polarization component parallel to the incidence plane are 0.1 or less respectively.

$$\Delta x = x(0°) - x(50°) \quad (1)$$

(In the above equation (1),) x(0°) is the hue x of the transmission spectrum of polarization incident at an angle of 0°, and x(50°) is the hue x of the transmission spectrum of polarization incident at an angle of 50°.)

$$\Delta y = y(0°) - y(50°) \quad (2)$$

(In the above equation (2), y(0°) is the hue y of the transmission spectrum of polarization incident at an angle of 0°, and y(50°) is the hue y of the transmission spectrum of polarization incident at an angle of 50°.)

7. The multi-layer stretched film in any one of the above paragraphs 1 to 6, wherein the hue changes Δx and Δy represented by the following equations (1) and (2) of a polarization component perpendicular to the incidence plane are 0.01 or less respectively.

$$\Delta x = x(0°) - x(50°) \quad (1)$$

(In the above equation (1), x(0°) is the hue x of the transmission spectrum of polarization incident at an angle of 0°, and x(50°) is the hue x of the transmission spectrum of polarization incident at an angle of 50°.)

$$\Delta y = y(0°) - y(50°) \quad (2)$$

(In the above equation (2), y(0°) is the hue y of the transmission spectrum of polarization incident at an angle of 0°, and y(50°) is the hue y of the transmission spectrum of polarization incident at an angle of 50°.)

8. The multi-layer stretched film in any one of the above paragraphs 1 to 7 which has a thickness of 15 to 40 μm.
9. The multi-layer stretched film in any one of the above paragraphs 1 to 8, wherein the ratio of the thickness of the average layer of the second layers to the thickness of the average layer of the first layers is 1.5 to 5.0.
10. The multi-layer stretched film in any one of the above paragraphs 1 to 9, wherein a heat seal layer is further formed on at least one outermost layer out of the alternating first and second layers.
11. The multi-layer stretched film in the above paragraph 10, wherein the heat seal layer is made of the same thermoplastic resin as the second layers, the melting point of the thermoplastic resin is 20° or more lower than the melting point of the polyester of the first layers, and the heat seal layer has a thickness of 3 to 10 μm.
12. A brightness improving member which is composed of the multi-layer stretched film of any one of the above paragraphs 1 to 11.
13. A composite member for liquid crystal displays which has a light diffusing film on at least one side of the brightness improving member of the above paragraph 12.
14. The composite member for liquid crystal displays in the above paragraph 13, wherein a heat seal layer is interposed between a brightness improving member and a light diffusion film.
15. The composite member for liquid crystal displays in the above paragraph 13 which further has a prism layer on the opposite side to the brightness improving member via the light diffusion film.
16. A liquid crystal display comprising the brightness improving member of the above paragraph 12.
17. A liquid crystal display comprising the composite member for liquid crystal displays of any one of the above paragraphs 13 to 15.
18. A polarizing plate which is composed of the multi-layer stretched film of any one of the above paragraphs 1 to 11.
19. The polarizing plate in the above paragraph 18, wherein the multi-layer stretched film has (1) average reflectances at a wavelength of 400 to 800 nm for polarization incident at angles of 0° and 50° of a polarization component parallel to the incidence plane including the X direction with the film plane as a reflection plane of 95% or more respectively, and (2) average reflectances at a wavelength of 400 to 800 nm for polarization incident at angles of 0° and 50° of a polarization component perpendicular to the incidence plane including the X direction with the film plane as a reflection plane of 12% or less, respectively.
20. An optical member for liquid crystal displays comprising a first polarizing plate, a liquid crystal cell and a second polarizing plate in this order, wherein the first polarizing plate is the polarizing plate of the above paragraph 18 or 19.
21. The optical member for liquid crystal displays in the above paragraph 20, wherein the second polarizing plate is an absorption type polarizing plate.
22. An optical member for liquid crystal displays comprising a first polarizing plate, a liquid cell and a second polarizing plate in this order, wherein the polarizing plate of the above paragraph 18 or 19 is used as the first polarizing plate and the second polarizing plate.
23. An optical member for liquid crystal displays comprising a first polarizing plate, a liquid cell and a second polarizing plate in this order, wherein the first polarizing plate is a laminate consisting of the polarizing plate of the above paragraph 18 or 19 and another polarizing plate which is not an absorption type polarizing plate.
24. A liquid crystal display comprising a light source and the optical member for liquid crystal displays of any one of the above paragraphs 20 to 23, wherein the first polarizing plate is arranged on the light source side.
25. The liquid crystal display in the above paragraph 24 which has no reflection type polarizing plate between the light source and the first polarizing plate.

BEST MODE FOR CARRYING OUT THE INVENTION

[Multi-Layer Stretched Film]

Figure 1:
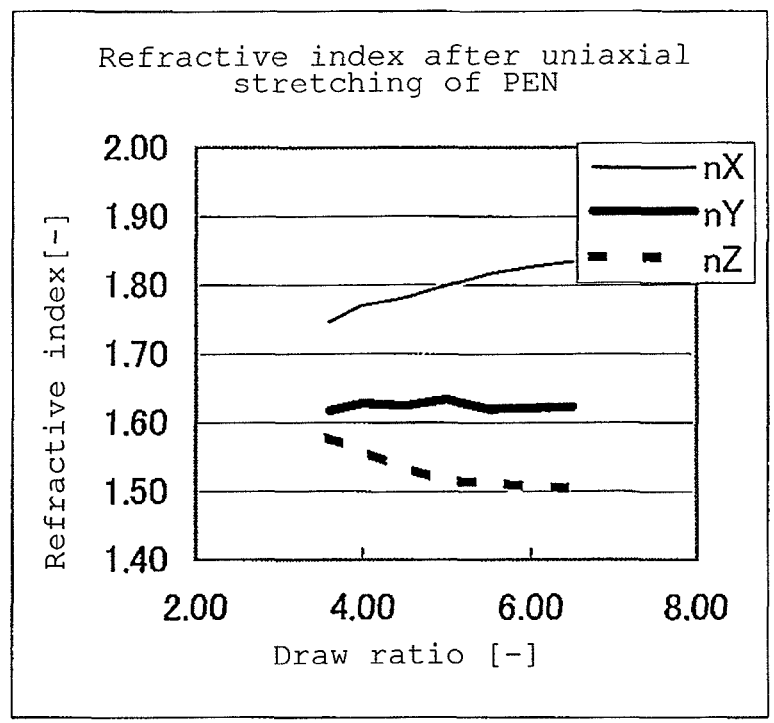
FIG. 1 shows refractive indices in a stretching direction (X direction), a direction (Y direction) orthogonal to the stretching direction and a thickness direction (Z direction) after the uniaxial stretching of 2,6-PEN (represented by $n_X$, $n_Y$ and $n_Z$, respectively)

The multi-layer stretched film of the present invention is a film which has 251 or more alternating layers consisting of first and second layers and is stretched in at least a uniaxial direction. The first layers are layers having a higher refractive index than the second layers, and the second layers are layers having a lower refractive index than the first layers.

The characteristic features of the present invention are that a polyester which has a high refractive index and contains specific comonomers is used in the first layers having a fixed thickness and constituting the multi-layer stretched film and a thermoplastic resin which is isotropic and has an average refractive index of 1.50 to 1.60 and a small change in refractive index by stretching is used in the second layers having a fixed thickness and constituting the multi-layer stretched film.

By forming the first layers from the specific polyester which will be described hereinafter, the difference in refractive index between the X direction and the Y direction of the first layers after stretching can be made larger than in the prior art and the difference in refractive index between layers in the Y direction and the Z direction can be made small for the first time. Thus, the specific polyester of the present invention whose use in the first layers of a multi-layer film having a reflection polarization function has been unknown is used in the first layers in combination with the thermoplastic resin of the second layers which will be described hereinafter to prepare a multi-layer film having a certain layer thickness, whereby the improvement of polarization performance and the elimination of a hue shift of transmitted polarization from diagonally incident light both of which have been difficult can be achieved at the same time. Further, since polarization performance becomes higher than in the prior art, the thickness of a film having the same level of polarization performance as that of the prior art can be reduced to about 1/3 that of the prior art, thereby making it possible to further reduce the thickness of a display.

The refractive index in the stretching direction (X direction) may be represented by "$n_X$", the refractive index in a direction (Y direction) orthogonal to the stretching direction may be represented by "$n_Y$", and the refractive index in the thickness direction (Z direction) of the film may be represented by "$n_Z$".

The multi-layer stretched film of the present invention will be further detailed hereinunder.

[First Layers]

In the present invention, the polyester constituting the first layers (may be referred to as "aromatic polyester (I)" hereinafter) is obtained by polycondensing the following dicarboxylic acid component and the following diol component.

(Dicarboxylic Acid Component)

At least two aromatic dicarboxylic acid components which consist of 5 to 50 mol % of a component represented by the following formula (A) and 50 to 95 mol % of a component represented by the following formula (B) or derivatives thereof are used as the dicarboxylic acid component (i) constituting the aromatic polyester (I) of the present invention. The content of each of the aromatic dicarboxylic acid components is based on the total number of moles of all the dicarboxylic acid components.

(A)

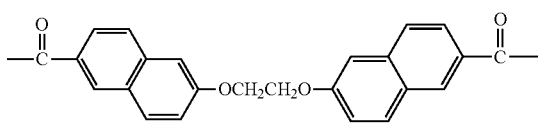

(In the above formula (A), $R^A$ is an alkylene group having 2 to 10 carbon atoms.)

(B)

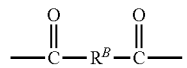

(In the above formula (B), $R^B$ is a phenylene group or naphthalenediyl group.)

As for the component represented by the formula (A), in the formula, $R^A$ is an alkylene group having 2 to 10 carbon atoms. Examples of the alkylene group include ethylene group, propylene group, isopropylene group, tetramethylene group, hexamethylene group and octamethylene group.

The lower limit value of the content of the component represented by the formula (A) is preferably 7 mol %, more preferably 10 mol %, much more preferably 15 mol %. The upper limit value of the content of the component represented by the formula (A) is preferably 45 mol %, more preferably 40 mol %, much more preferably 35 mol %, particularly preferably 30 mol %. Therefore, the content of the component represented by the formula (A) is preferably 5 to 45 mol %, more preferably 7 to 40 mol %, much more preferably 10 to 35 mol %, particularly preferably 15 to 30 mol %.

Preferred examples of the component represented by the formula (A) include components derived from 6,6'-(ethylenedioxy)di-2-naphthoic acid, 6,6'-(trimethylenedioxy)di-2-naphthoic acid and 6,6'-(butylenedioxy)di-2-naphthoic acid. Out of these, a component of the formula (A) in which the number of carbon atoms of $R^A$ is even is preferred, and a component derived from 6,6'-(ethylenedioxy)di-2-naphthoic acid represented by the following formula (A-1) is particularly preferred.

(A-1)

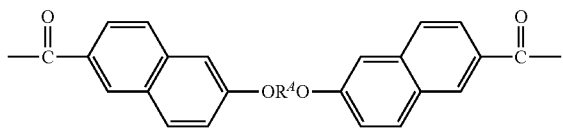

The aromatic polyester (I) comprises a dicarboxylic acid component which contains 5 to 50 mol % of the component represented by the formula (A). When the content of the component represented by the formula (A) falls below the lower limit value, there is no reduction in refractive index in the Y direction by stretching, whereby the difference between the refractive index $n_Y$ in the Y direction and the refractive index $n_Z$ in the Z direction of the stretched film becomes large, thereby making it difficult to improve a hue shift caused by polarization incident at a diagonal angle of incidence. When the content of the component represented by the formula (A) exceeds the upper limit value, amorphous properties become marked and the difference between the refractive index $n_X$ in the X direction and the refractive index $n_Y$ in the Y direction of the stretched film becomes small. Therefore, the stretched film does not exhibit satisfactory performance as a reflection polarization film.

By using the polyester comprising the component represented by the formula (A), a multi-layer stretched film which has higher polarization performance than in the prior art as a reflection polarization film and is free from a hue shift caused by the diagonal angle of incidence can be produced.

As for the component represented by the formula (B), in the formula, $R^B$ is a phenylene group or naphthalenediyl group.

Examples of the component represented by the formula (B) include components derived from terephthalic acid, isophthalic acid, 2,6-naphthalenedicarboxylic acid, 2,7-naphthalenedicarboxylic acid and combinations thereof, out of which a component derived from 2,6-naphthalenedicarboxylic acid is particularly preferred.

The lower limit value of the content of the component represented by the formula (B) is preferably 55 mol %, more preferably 60 mol %, much more preferably 65 mol %, particularly preferably 70 mol %. The upper limit value of the content of the component represented by the formula (B) is preferably 93 mol %, more preferably 90 mol %, much more preferably 85 mol %. Therefore, the content of the component represented by the formula (B) is preferably 55 to 95 mol %, more preferably 60 to 93 mol %, much more preferably 65 to 90 mol %, particularly preferably 70 to 85 mol %.

When the content of the component represented by the formula (B) falls below the lower limit value, amorphous properties become marked and the difference between the refractive index $n_X$ in the X direction and the refractive index $n_Y$ in the Y direction of the stretched film becomes small. Therefore, the stretched film does not exhibit satisfactory performance as a reflection polarization film. When the content of the component represented by the formula (B) exceeds the upper limit value, the content of the component represented by the formula (A) becomes relatively low, whereby the difference between the refractive index $n_Y$ in the Y direction and the refractive index $n_Z$ in the Z direction of the stretched film becomes large, thereby making it difficult to improve a hue shift caused by polarization incident at a diagonal angle of incidence.

By using the polyester containing the component represented by the formula (B), a high refractive index in the X direction and birefringence characteristic with high uniaxial orientation can be achieved at the same time.

(Diol Component)

A diol component represented by the following formula (C) is used in an amount of 90 to 100 mol % as the diol component (ii) constituting the aromatic polyester (I) of the present invention. The content of the diol component is based on the total number of moles of all the diol components.

(C)

(In the above formula (C), $R^C$ is an alkylene group having 2 to 10 carbon atoms.)

The content of the diol component represented by the formula (C) is preferably 95 to 100 mol %, more preferably 98 to 100 mol %.

In the above formula (C), $R^C$ is an alkylene group having 2 to 10 carbon atoms. Examples of the alkylene group include ethylene group, propylene group, isopropylene group, tetramethylene group, hexamethylene group and octamethylene group. Out of these, components derived from ethylene glycol, trimethylene glycol, tetramethylene glycol and cyclohexane dimethanol are preferred as the diol component represented by the formula (C). A component derived from ethylene glycol is particularly preferred. When the content of the diol component represented by the formula (C) falls below the lower limit value, the above uniaxial orientation is impaired.

(Aromatic Polyester (I))

In the aromatic polyester (I), the content of an ester unit (-(A)-(C)-) composed of the acid component represented by the formula (A) and the diol component represented by the formula (C) is 5 to 50 mol %, preferably 5 to 45 mol %, more preferably 10 to 40 mol % based on the total of all the recurring units.

Examples of the other ester unit constituting the aromatic polyester (I) include alkylene terephthalate units such as ethylene terephthalate, trimethylene terephthalate and butylene terephthalate, and alkylene-2,6-naphthalene dicarboxylate units such as ethylene-2,6-naphthalene dicarboxylate, trimethylene-2,6-naphthalene dicarboxylate and butylene-2,6-naphthalene dicarboxylate. Out of these, ethylene terephthalate unit and ethylene-2,6-naphthalene dicarboxylate unit are preferred, and ethylene-2,6-naphthalene dicarboxylate unit is particularly preferred from the viewpoint of a high refractive index.

The aromatic polyester (I) is particularly preferably a polyester comprising a dicarboxylic acid component represented by the following formula (A-1) as the dicarboxylic acid component represented by the formula (A), an aromatic dicarboxylic acid component derived from 2,6-naphthalenedicarboxylic acid as the dicarboxylic acid component represented by the formula (B) and ethylene glycol as the diol component.

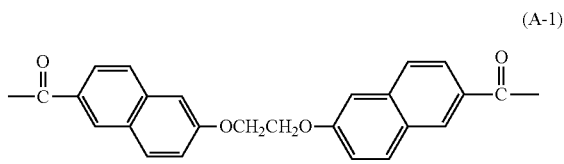
(A-1)

The aromatic polyester (I) has an intrinsic viscosity measured at 35° C. in a mixed solvent of P-chlorophenol and 1,1,2,2-tetrachloroethane (weight ratio of 40/60) of preferably 0.4 to 3 dl/g, more preferably 0.4 to 1.5 dl/g, particularly preferably 0.5 to 1.2 dl/g.

The aromatic polyester (I) has a melting point of preferably 200 to 260° C., more preferably 205 to 255° C., much more preferably 210 to 250° C. The melting point can be measured by DSC.

When the melting point of the polyester exceeds the upper limit value and the polyester is molded by melt extrusion, the fluidity of the polyester deteriorates, whereby its delivery may become nonuniform. When the melting point falls below the lower limit value, though film formability is excellent, the mechanical properties of the polyester are apt to be impaired and the refractive index characteristic of the present invention is hardly obtained.

In general, a copolymer has a lower melting point and lower mechanical properties than a homopolymer. However, the polyester of the present invention is a copolymer containing the component of the formula (A) and the component of the formula (B) and has the same level of mechanical strength as that of a homopolymer of the component of the formula (A) though it has a lower melting point than that of the homopolymer.

The glass transition temperature (may be referred to as "Tg" hereinafter) of the aromatic polyester (I) is preferably 80 to 120° C., more preferably 82 to 118° C., much more preferably 85 to 118° C. When Tg falls within this range, a film having excellent heat resistance and dimensional stability is obtained. The melting point and the glass transition temperature can be adjusted by controlling the types and amounts of comonomers and a dialkylene glycol as a by-product.

The aromatic polyester (I) can be produced in accordance with the method described at page 9 of WO2008/153188.

(Thickness of First Layers)

Each of the first layers of the present invention has a thickness of 0.01 to 0.5 μm. When the thickness of each of the first layers falls within the above range, the obtained film can selectively reflect light due to optical interference between layers.

(Refractive Index of First Layers)

Figure 2:
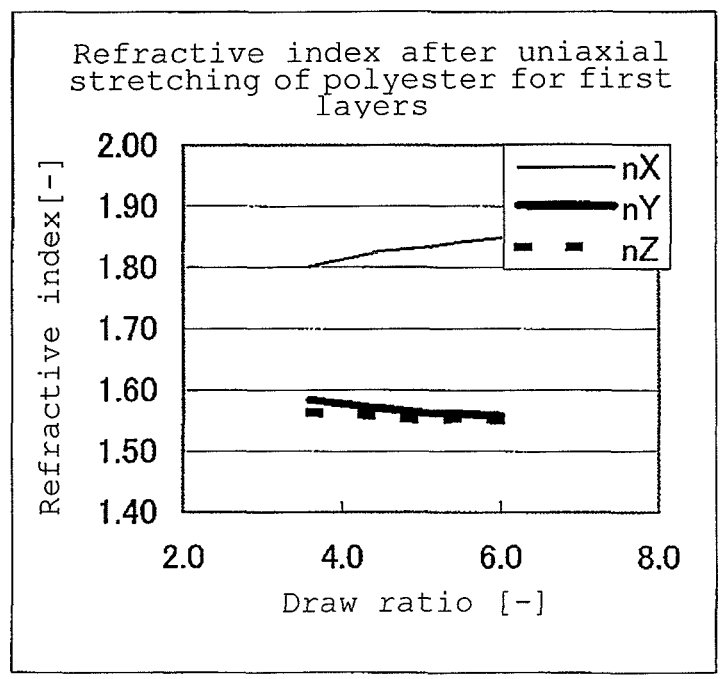
FIG. 2 shows refractive indices in the stretching direction (X direction), the direction (Y direction) orthogonal to the stretching direction and the thickness direction (Z direction) after the uniaxial stretching of an aromatic polyester (I) for first layers in the present invention (represented by $n_X$, $n_Y$ and $n_Z$, respectively)
Figure 3:
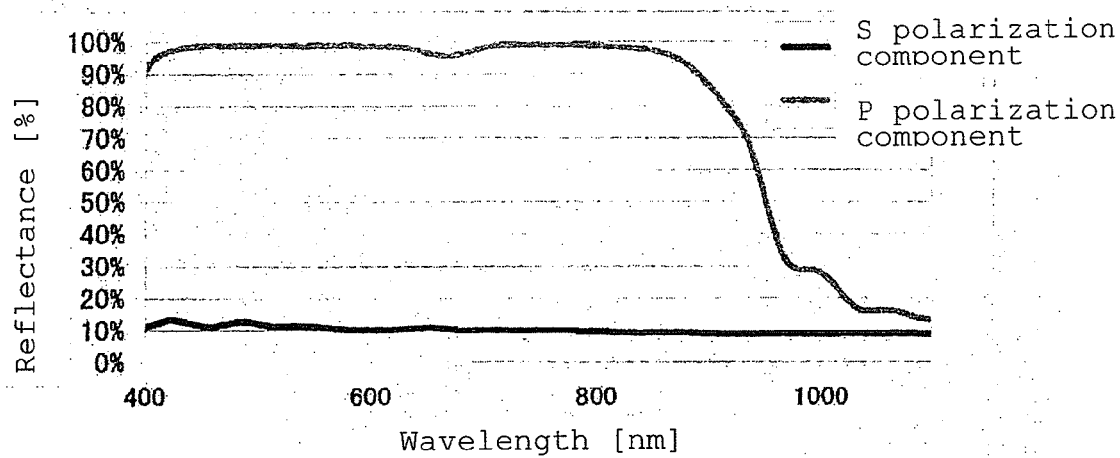
FIG. 3 is an example of a graph of reflectance for the wavelength of a polarization component (P polarization component) parallel to the incidence plane including the stretching direction (X direction) and the wavelength of a polarization component (S polarization component) perpendicular to the incidence plane including the stretching direction (X direction) with the film plane of the multi-layer stretched film of the present invention as a reflection plane. The incidence angle is 0°.

The change of the refractive index in each direction when the aromatic polyester (I) is uniaxially stretched is shown in FIG. 2. As shown in FIG. 2, the refractive index $n_X$ in the X direction is increased by stretching and the refractive index $n_Y$ in the Y direction and the refractive index $n_Z$ in the Z direction are reduced by stretching. The difference between $n_Y$ and $n_Z$ is very small regardless of the draw ratio.

The first layers have a high refractive index $n_X$ in the X direction of 1.80 to 1.90 when the aromatic polyester (I) containing the above specific comonomers is stretched uniaxially. When the refractive index in the X direction of the first layers falls within this range, the difference in refractive index between the first layers and the second layers becomes large and satisfactory reflection polarization performance can be obtained.

The difference between the refractive index $n_Y$ after uniaxial stretching in the Y direction and the refractive index $n_Z$ after uniaxial stretching in the Z direction is preferably 0.05 or less, more preferably 0.03 or less, particularly preferably 0.01 or less. Since the difference in refractive index between these two directions is extremely small, even when polarized light is incident at a diagonal angle of incidence, no hue shift occurs.

Meanwhile, when the polyester constituting the first layers is polyethylene-2,6-naphthalene dicarboxylate (PEN), as shown in FIG. 1, the refractive index $n_y$ in the Y direction is fixed and does not drop regardless of the draw ratio in the uniaxial direction whereas the refractive index $n_Z$ in the Z direction drops as the uniaxial draw ratio increases. Therefore, the difference between the refractive index $n_Y$ in the Y direction and the refractive index $n_Z$ in the Z direction becomes large and a hue shift readily occurs when polarized light is incident at a diagonal angle of incidence.

[Second Layers]
(Thermoplastic Resin)

In the present invention, the second layers are made of a thermoplastic resin having an average refractive index of 1.50 to 1.60 and differences in refractive index among the X direction, the Y direction and the Z direction of 0.05 or less before and after stretching. The average refractive index is obtained by melting the thermoplastic resin constituting the second layers by itself, extruding it from a die to produce an unstretched film, measuring the refractive indices in the X direction, Y direction and Z direction of the obtained film by means of the prism coupler of Metricon Co., Ltd. at a wavelength of 633 nm and calculating the average value of the measurement data.

As for the difference in refractive index before and after stretching, the thermoplastic resin constituting the second layers is first molten by itself and extruded from a die to form an unstretched film. The refractive indices at a wavelength of 633 nm in the X direction, Y direction and Z direction of the obtained film are measured by means of the prism coupler of Metricon Co., Ltd. to obtain an average refractive index from the average value of the refractive indices in the three directions as the refractive index before stretching. Then, as for the refractive index after stretching, the thermoplastic resin constituting the second layers is molten by itself, extruded from a die and stretched to 5 times at 135° C. in a uniaxial direction to form a uniaxially stretched film, the refractive indices at a wavelength of 633 nm in the X direction, Y direction and Z direction of the obtained film are measured by means of the prism coupler of Metricon Co., Ltd. to obtain the refractive indices in these directions after stretching, and differences in refractive index among the three directions before and after stretching are compared with one another.

The average refractive index of the thermoplastic resin constituting the second layers is preferably 1.53 to 1.60, more preferably 1.55 to 1.60, much more preferably 1.58 to 1.60. When the second layers are made of an isotropic material having the above average refractive index and a small difference in refractive index before and after stretching, the difference in refractive index in the X direction between the first layers and the second layers after stretching becomes large and the difference between the refractive index in the Y direction and the refractive index in the Z direction is extremely small with the result that the improvement of polarization performance and the elimination of a hue shift caused by the diagonal angle of incidence can be achieved at the same time.

Out of thermoplastic resins having the above refractive index characteristic, a crystalline polyester is preferred from the viewpoint of film formability by uniaxial stretching. Preferred examples of the crystalline polyester having the above refractive index characteristic include copolyethylene terephthalates, copolyethylene naphthalene dicarboxylates and blends of the copolyesters and an amorphous polyester. Out of these, copolyethylene terephthalates are preferred. Out of the copolyethylene terephthalates, a polyester comprising an ethylene terephthalate component containing isophthalic acid or 2,6-naphthalenedicarboxylic acid as the main component is preferred. A polyester comprising an ethylene terephthalate component containing isophthalic acid or 2,6-naphthalenedicarboxylic acid as the main component and having a melting point of 220° C. or lower is particularly preferred.

In the case of the copolyethylene terephthalate, the content of a comonomer component other than the above components is preferably in the range of 10 mol % or less based on the total of all the recurring units constituting the polyester of the second layers. Preferred examples of the comonomer component include acid components such as aromatic carboxylic acids other than the main comonomer component, including isophthalic acid, 2,6-naphthalenedicarboxylic acid and 2,7-naphthalenedicarboxylic acid; aliphatic dicarboxylic acids including adipic acid, azelaic acid, sebacic acid and decanedicarboxylic acid; and alicyclic dicarboxylic acids including cyclohexanedicarboxylic acid, and glycol components such as aliphatic diols including butanediol and hexanediol; and alicyclic diols including cyclohexane dimethanol.

Out of these, two comonomer components which are isophthalic acid and 2,6-naphthalenedicarboxylic acid are preferred because they reduce the melting point of the thermoplastic resin relatively easily while retaining stretchability. That is, the thermoplastic resin forming the second layers is preferably a polyester which comprises an ethylene terephthalate component containing isophthalic acid and 2,6-naphthalenedicarboxylic acid as the main component. The melting point of the thermoplastic resin constituting the second layers does not need to be low before a film is formed and should be low after stretching. For example, two or more polyesters may be blended together and transesterified when they are melt kneaded together.

(Thickness of Second Layers)

Each of the second layers has a thickness of 0.01 to 0.5 μm. When each of the second layers has a thickness within the above range, it is possible to selectively reflect light due to optical interference between layers.

(Difference in Refractive Index Between First Layers and Second Layers)

The difference in refractive index in the X direction between the first layers and the second layers is preferably 0.10 to 0.45, more preferably 0.20 to 0.40, particularly preferably 0.25 to 0.30. When the difference in refractive index in the X direction falls within the above range, reflection characteristic can be enhanced efficiently, thereby making it possible to obtain a high reflectance with a small number of layers.

The difference in refractive index in the Y direction between the first layers and the second layers and the difference in refractive index in the Z direction between the first layers and the second layers are preferably 0.05 or less, respectively. When the differences in refractive index in the Y and Z directions between these layers fall within the above range and polarized light is incident at a diagonal angle of incidence, a hue shift can be suppressed.

[Component Other than Resin]

Preferably, the multi-layer stretched film of the present invention contains inert particles having an average particle diameter of 0.01 to 2 µm in at least one outermost layer in an amount of 0.001 to 0.5 wt % based on the weight of the layer in order to improve the windability of the film. When the average particle diameter of the inert particles is smaller than the lower limit value or the content of the inert particles is lower than the lower limit value, the effect of improving the windability of the multi-layer stretched film is apt to become unsatisfactory, and when the content of the inert particles is higher than the upper limit value or the average particle diameter of the inert particles is larger than the upper limit value, the deterioration of the optical properties of the multi-layer stretched film by the particles may become marked. The average particle diameter of the inert particles is preferably 0.02 to 1 µm, particularly preferably 0.1 to 0.3 µm. The content of the inert particles is preferably 0.02 to 0.2 wt %.

Examples of the inert particles to be contained in the multi-layer stretched film include inorganic inert particles such as silica, alumina, calcium carbonate, calcium phosphate, kaolin and talc, and organic inert particles such as silicone, crosslinked polystyrene and styrene-divinyl benzene copolymer. The shape of the particles is not particularly limited if it is a commonly used shape such as agglomerated or globular shape.

The inert particles may be contained in not only the outermost layer but also a layer made of the same resin as the outermost layer. For example, they may be contained in either the first layers or the second layers. Another layer different from the first layers and the second layers may be formed as the outermost layer, and when a heat seal layer is formed, the inert particles may be contained in the heat seal layer.

[Layer Constitution]

(Number of Layers)

The multi-layer stretched film of the present invention comprises a total of 251 or more alternating layers which consist of first and second layers. When the number of layers is smaller than 251, the constant average reflectance of a polarization component parallel to the incidence plane including the stretching direction is not obtained at a wavelength of 400 to 800 nm.

The upper limit of the number of layers is 2001 from the viewpoints of productivity and the handling ease of the film. The upper limit of the number of layers may be reduced, for example, to 1001, 501 or 301 from the viewpoints of productivity and handling ease if the average reflectance characteristic of the present invention is obtained.

(Thickness of Each Layer)

Each of the first layers and the second layers has a thickness of 0.01 to 0.5 µm in order to selectively reflect light due to optical interference between layers. The thickness of each layer can be obtained from a photo taken by a transmission electron microscope.

Since the reflection wavelength band of the multi-layer stretched film of the present invention ranges from the visible range to the near infrared range, the thickness of each of the layers must fall within the above range. When the thickness of each layer is larger than 0.5 µm, the reflection band becomes an infrared range, whereby the obtained film cannot be used as a reflection polarization film. When the thickness of each layer is smaller than 0.01 µm, the polyester component absorbs light, thereby making it impossible to obtain reflection performance.

The thickness of each of the first layers is preferably 0.01 to 0.1 µm. The thickness of each of the second layers is preferably 0.01 to 0.3 µm.

(Thickness Ratio of Maximum Layer and Minimum Layer)

In the multi-layer stretched film of the present invention, the ratio of the thickness of the maximum layer to the thickness of the minimum layer in the first layers and the second layers is 2.0 to 5.0, preferably 2.0 to 4.0, more preferably 2.0 to 3.5, much more preferably 2.0 to 3.0.

That is, the ratio of the thickness of the maximum layer to the thickness of the minimum layer in the first layers is 2.0 to 5.0, and the ratio of the thickness of the maximum layer to the thickness of the minimum layer in the second layers is 2.0 to 5.0.

For example, in a multi-layer stretched film having 126 first layers and 125 second layers, the thickness of the maximum layer out of the first layers is the thickness of a layer having the largest thickness out of the 126 first layers. The thickness of the minimum layer out of the first layers is the thickness of a layer having the smallest thickness out of the 126 first layers.

The thickness ratio of these layers is represented by the ratio of the thickness of the maximum layer to the thickness of the minimum layer. The thickness of the maximum layer and the thickness of the minimum layer in the first layers and the second layers can be obtained from a photo taken by using a transmission electron microscope.

In the multi-layer stretched film, the wavelength to be reflected is determined by the difference in refractive index between layers, the number of layers and the thickness of each layer. When the first layers and the second layers have a fixed thickness, only a specific wavelength can be reflected, and the average reflectance of a polarization component parallel to the incidence plane including the stretching direction (X direction) cannot be uniformly increased at a wide wavelength range from 400 to 800 nm. When the ratio of the thickness of the maximum layer to the thickness of the minimum layer exceeds the upper limit value, the reflection range becomes too wide and the reflectance of the polarization component parallel to the incidence plane including the stretching direction (X direction) drops.

The first layers and the second layers may change in thickness stepwise or continuously. When the first layers and the second layers change in thickness, light having a wider wavelength range can be reflected.

Although the means of forming the multiple layers of the multi-layer stretched film of the present invention is not particularly limited, for example, a multi-layer feed block apparatus is used to divide the polyester for first layers into 137 layers and the thermoplastic resin for second layers into 138 layers, form the first layers and the second layers alternately, and change the sizes of their flow passages to 2.0 to 5.0 times continuously.

(Thickness Ratio of Average Layers of First Layers and Second Layers)

In the multi-layer stretched film of the present invention, the ratio of the thickness of the average layer of the second layers to the thickness of the average layer of the first layers is preferably 1.5 to 5.0. The lower limit value of the ratio of the thickness of the average layer of the second layers to the thickness of the average layer of the first layers is more preferably 2.0. The upper limit value of the ratio of the thickness of the average layer of the second layers to the thickness of the average layer of the first layers is more preferably 4.0, much more preferably 3.5.

When the ratio of the thickness of the average layer of the second layers to the thickness of the average layer of the first layers falls within the above range, secondary reflection which occurs at half of the reflection wavelength can be used effectively, whereby the ratio of the thickness of the maximum layer to the thickness of the minimum layer in the first layers and the second layers can be minimized, which is preferred from the viewpoint of optical properties. By changing the thickness ratio of the first layers and the second layers like this, the mechanical properties of the obtained film can be adjusted without changing the resin in use while adhesion between layers is maintained, whereby the film is hardly broken.

On the other hand, when the ratio of the thickness of the average layer of the second layers to the thickness of the average layer of the first layers is outside the above range, secondary reflection which occurs at half of the reflection wavelength becomes small, whereby reflectance may lower.

(Thickness Control Layer)

The multi-layer stretched film of the present invention may comprise a thickness control layer having a thickness of 2 μm or more in part of the alternating laminate constitution of first and second layers in addition to the first layers and the second layers. When the thickness control layer is formed in part of the alternating laminate constitution of first and second layers, the thicknesses of each of the first layers and each of the second layers can be easily and uniformly adjusted without affecting the polarization function. The thickness control layer may have the same composition as that of either the first layers or the second layers or may partially include the compositions of the layers and does not contribute to reflection characteristic as it is thick. Since it may affect transmitted polarized light, when it contains particles, it preferably contains the particles within the above concentration range.

[Uniaxially Stretched Film]

The multi-layer stretched film of the present invention is stretched at least in a uniaxial direction to meet the requirements for optical properties as a reflection polarization film of interest. The uniaxially stretched film of the present invention includes a film which is stretched only in a uniaxial direction and a film which is stretched in biaxial directions and stretched more in one direction. The uniaxial stretching direction (X direction) may be either the longitudinal direction or the transverse direction of the film. In the case of a film which is stretched in biaxial directions and stretched more in one direction, the direction (X direction) in which the film is stretched more may be either the longitudinal direction or the transverse direction of the film, and the draw ratio in a direction with a lower draw ratio is preferably 1.05 to 1.20 times in order to enhance polarization performance. In the case of a film which is stretched in biaxial directions and stretched more in one direction, the "stretching direction" in the relationship between polarized light and refractive index is a direction in which the film is stretched more out of the biaxial directions.

As the stretching method, a known stretching method such as heat stretching with a rod-like heater, roll heat stretching or tenter stretching may be used. From the viewpoints of the reduction of the number of scratches formed by contact with the roll and the stretching speed, tenter stretching is preferred.

[Film Thickness]

The multi-layer stretched film of the present invention preferably has a thickness of 15 to 40 μm. A prior art multi-layer film having a reflection polarization function must have a larger number of layers than that of the present invention and have a thickness of about 100 μm in order to obtain an average reflectance for P polarization of about 90%. On the contrary, the present invention is characterized by finding that, since a multi-layer film having a certain layer thickness is produced by combining the aromatic polyester (I) having specific comonomer components as a resin constituting the first layers and the above-described thermoplastic resin for the second layers, if the level of polarization performance is the same as that of the prior art, the number of layers can be reduced and the film thickness can be reduced to 40 μm or less which is about ⅓ that of the prior art. Due to this film thickness, the thickness of a display can be made small.

[Average Reflectance]

The multi-layer stretched film of the present invention has average reflectances at a wavelength of 400 to 800 nm for polarization incident at angles of 0° and 50° of a polarization component parallel to the incidence plane including the stretching direction (X direction) of a uniaxially stretched film with the film plane as a reflection plane of 90% or more.

The average reflectances at a wavelength of 400 to 800 nm for polarization incident at angles of 0° and 50° of a polarization component perpendicular to the incidence plane including the stretching direction (X direction) of the uniaxially stretched film with the film plane as a reflection plane are 15% or less.

The incidence plane is perpendicular to the reflection plane and includes an incident ray and a reflected ray. The polarization component parallel to the incidence plane including the stretching direction (X direction) of the uniaxially stretched film with the film plane as a reflection plane is also generally called "P polarization". The polarization component perpendicular to the incidence plane including the stretching direction (X direction) of the uniaxially stretched film with the film plane as a reflection plane is also generally called "S polarization". Further, the incidence angle indicates an incidence angle with respect to a direction perpendicular to the film plane.

The average reflectance at a wavelength of 400 to 800 nm for polarization incident at an angle of 0° of the polarization component (P polarization) parallel to the incidence plane including the stretching direction (X direction) of the uniaxially stretched film with the film plane as a reflection plane is more preferably 95 to 100%, particularly preferably 98 to 100%.

The average reflectance at a wavelength of 400 to 800 nm for polarization incident at an angle of 50° of the polarization component parallel to the incidence plane including the stretching direction (X direction) of the uniaxially stretched film with the film plane as a reflection plane is more preferably 93 to 99%, particularly preferably 95 to 98%.

When the average reflectance at a wavelength of 400 to 800 nm for the P polarization component at the above incidence angle falls below the lower limit value, the deterioration of polarization reflection performance as a reflection polarization film and a hue shift of reflected light occur, and coloring occurs when the uniaxially stretched film is used in a display. Although polarization reflection performance improves as the average reflectance becomes higher within the above range, it may be difficult to increase the average reflectance to a value larger than the above upper limit value from the relationship between composition and stretching.

When the multi-layer stretched film of the present invention has high average reflectance characteristic for the P polarization component and reflectance characteristic for the S polarization component which will be described hereinafter, it can be advantageously used as a brightness improving member in a first aspect of the liquid crystal display of the present invention.

When the average reflectances for the P polarization component at incidence angles of 0° and 50° are 95% or more within the above range, high polarization performance that the quantity of the transmitted P polarization is reduced more than in the prior art and S polarization is selectively transmitted is developed, high polarization performance equivalent to that of a prior art absorption type polarizing plate is obtained, and the multi-layer stretched film of the present invention can be used as a polarizing plate to be laminated with a liquid crystal cell by itself as in a second aspect of the liquid crystal display of the present invention. At the same time, the multi-layer stretched film of the present invention can also serve as a brightness improving film which reutilizes P polarization in a direction orthogonal to the transmission axis as it is highly reflected without being absorbed by the film. Since the multi-layer stretched film of the present invention has such a high average reflectance for P polarization incident at an angle of 50°, high polarization performance is obtained and the transmission of diagonally incident light can be highly suppressed, thereby preventing a hue shift caused by the light.

The average reflectance at a wavelength of 400 to 800 nm for polarization incident at an angle of 0° of the polarization component (S polarization) perpendicular to the incidence plane including the stretching direction (X direction) of the uniaxially stretched film with the film plane as a reflection plane is more preferably 12% or less, much more preferably 5 to 12%, particularly preferably 8 to 12%.

The average reflectance at a wavelength of 400 to 800 nm for polarization incident at an angle of 50° of the polarization component perpendicular to the incidence plane including the stretching direction (X direction) of the uniaxially stretched film with the film plane as a reflection plane is more preferably 12% or less, much more preferably 5 to 10%, particularly preferably 8 to 10%.

When the average reflectance at a wavelength of 400 to 800 nm for the S polarization component at the above incidence angle exceeds the upper limit value, the polarization transmittance of the film as a reflection polarization film lowers, whereby it does not exhibit satisfactory performance as a brightness improving film for liquid crystal displays or a polarizing plate to be laminated with a liquid crystal cell.

Although the transmittance of the S polarization component becomes higher as the polarization reflectance is lower within the above range, it may be difficult to reduce the polarization reflectance to a value smaller than the lower limit value due to the relationship between composition and stretching. Particularly when the average reflectance of the above P polarization is high and the reflectance of the S polarization is 12% or less, high polarization performance equivalent to that of a prior art absorption type polarizing plate is obtained due to an increase in the amount of the S polarization transmitted to the opposite side to the light source and the obtained film can be advantageously used by itself as a polarizing plate to be laminated with a liquid crystal cell like the second aspect of the liquid crystal display of the present invention.

To obtain the average reflectance characteristic for the P polarization component, in addition to the thickness of each layer and the number of layers, it can be attained by using a polymer having the above characteristics as the polymer component constituting the first layers and the second layers and stretching it at a certain draw ratio in the stretching direction (X direction) to make the film in-plane direction of the first layers birefringent so that the difference in refractive index between the first layers and the second layers in the stretching direction (X direction) becomes large.

To obtain the average reflectance characteristic for the S polarization component, it can be attained by using a polymer having the above characteristics as the polymer component constituting the first layers and the second layers and not stretching it in a direction (Y direction) orthogonal to the stretching direction or stretching it at a low draw ratio to make the difference in refractive index between the first layers and the second layers in the orthogonal direction (Y direction) extremely small.

(Refractive Index Characteristic of First Layers)

The refractive index $n_X$ in the X direction of the polyester of the first layers is increased to preferably 0.20 or more, more preferably 0.25 or more, much more preferably 0.27 or more by stretching. Although polarization performance can be enhanced when the change of refractive index is large, if the draw ratio is too high, the film is broken. Therefore, the upper limit value of the refractive index is limited to 0.35, specifically 0.30.

The refractive index $n_Y$ in the Y direction of the polyester of the first layers is reduced to preferably 0.05 to 0.20, more preferably 0.06 to 0.15, much more preferably 0.07 to 0.10 by stretching. When the reduced refractive index falls below the lower limit value and the resins for the both layers are selected to make the refractive indices of these layers in the Y direction equal to each other, the difference in refractive index between layers in the Z direction becomes larger as the difference in refractive index between layers in the X direction is increased, whereby it may be difficult to obtain the improvement of polarization performance and the elimination of a hue shift of transmitted polarization from diagonally incident light at the same time. When the reduced refractive index exceeds the upper limit value, mechanical strength may become unsatisfactory due to too high orientation.

The refractive index $n_Z$ in the Z direction of the polyester of the first layers is reduced to preferably 0.05 to 0.20, more preferably 0.06 to 0.15, much more preferably 0.07 to 0.10 by stretching. To set the reduced refractive index to a value smaller than the lower limit value, orientation in the X direction must be made low, whereby the difference in refractive index between layers in the X direction may not be sufficiently large. When the reduced refractive index exceeds the upper limit value, mechanical strength may become unsatisfactory due to too high orientation.

The difference between the refractive index $n_Y$ in the

Y direction and the refractive index $n_Z$ in the Z direction after the stretching of the first layers is preferably 0.05 or less, more preferably 0.03 or less, particularly preferably 0.01 or less. When the difference in refractive index between these two directions is very small, if polarized light is incident at a diagonal angle of incidence, a hue shift does not occur. The polarized light is particularly effective in eliminating a hue shift of the polarization component (S polarization) perpendicular to the incidence plane including the stretching direction (X direction) of the uniaxially oriented film with the film plane as a reflection plane.

[Hue Change]The multi-layer stretched film of the present invention has hue changes Δx and Δy represented by the following equations (1) and (2) of a polarization component parallel to the incidence plane of preferably 0.1 or less, more preferably 0.09 or less, particularly preferably 0.08 or less.

$$\Delta x = x(0°) - x(50°) \quad (1)$$

(In the above equation (1), x(0°) is the hue x of the transmission spectrum of polarization incident at an angle of 0°, and x(50°) is the hue x of the transmission spectrum of polarization incident at an angle of 50°.)

$$\Delta y = y(0°) - y(50°) \quad (2)$$

(In the above equation (2), y(0°) is the hue y of the transmission spectrum of polarization incident at an angle of 0°, and y(50°) is the hue y of the transmission spectrum of polarization incident at an angle of 50°.)

The hues x and y of the polarization component (P polarization) parallel to the incidence plane are represented by values Y, x and y in the CIE color system for a standard light source C in accordance with JIS Z8729 based on the transmission spectra measured at incidence angles of 0° and 50° of the P polarization of the film.

The hue changes Δx and Δy represented by the equations (1) and (2) indicate the changes of hues x and y of an incident polarization component in a direction (0°) perpendicular to the film plane and an incident polarization component in a 50° oblique direction from the direction perpendicular to the film plane and correspond to a hue shift of the transmitted P polarization.

When the hue changes Δx and Δy exceed the upper limit values, a hue shift of the transmitted P polarization caused by the diagonal angle of incidence becomes large and when the obtained film is used as a brightness improving film or a reflection polarization film to be laminated with a liquid crystal cell, visibility may degrade with a large hue shift at a high view angle.

The multi-layer stretched film of the present invention has hue changes Δx and Δy represented by the following equations (1) and (2) of a polarization component perpendicular to the incidence plane of preferably 0.01 or less, more preferably 0.005 or less, particularly preferably 0.003 or less.

$$\Delta x = x(0°) - x(50°) \quad (1)$$

(In the above equation (1), x(0°) is the hue x of the transmission spectrum of polarization incident at an angle of 0°, and x(50°) is the hue x of the transmission spectrum of polarization incident at an angle of 50°.)

$$\Delta y = y(0°) - y(50°) \quad (2)$$

(In the above equation (2), y(0°) is the hue y of the transmission spectrum of polarization incident at an angle of 0°, and y(50°) is the hue y of the transmission spectrum of polarization incident at an angle of 50°.)

The hues x and y of the polarization component (S polarization) perpendicular to the incidence plane are represented by values Y, x and y in the CIE color system for a standard light source C in accordance with JIS Z8729 based on the transmission spectra measured at incidence angles of 0° and 50° of the S polarization of the film.

The hue changes Δx and Δy indicate the changes of hues x and y of an incident polarization component in a direction) (0°) perpendicular to the film plane and an incident polarization component in a 50° oblique direction from the direction perpendicular to the film plane and correspond to a hue shift of the transmitted S polarization.

When the hue changes Δx and Δy exceed the upper limit values, a hue shift of the transmitted S polarization caused by the diagonal angle of incidence becomes large and when the obtained film is used as a brightness improving film or a reflection polarization film to be laminated with a liquid crystal cell, visibility may degrade with a large hue shift at a high view angle. These hue changes are attained by using the above specific polyesters as the thermoplastic resins constituting the first layers and the second layers.

[Heat Seal Layer]

The multi-layer stretched film of the present invention may further comprise a heat seal layer on at least one outermost layer out of the alternating first and second layers. When the film has this heat seal layer and is to be laminated with another member as a member of a liquid crystal display, these members can be bonded together via the heat seal layer by a heat treatment.

A thermoplastic resin having the same melting point as or lower melting point than the melting point of the outermost layer out of the alternating layers is preferably used in the heat seal layer. However, the same thermoplastic resin as that of the second layers is preferably used because it can be formed at the same time as the alternating layers. Preferably, the thermoplastic resin has a melting point 20° C. or more lower than the melting point of the polyester of the first layers and the heat seal layer has a thickness of 3 to 10 μm. When the heat seal layer has the above melting point and the above thickness, it can firmly bond members to each other.

When the same thermoplastic resin as that of the second layers is used in the heat seal layer, the heat seal layer has a thickness of 3 to 10 μm which is 4 times or more larger than 0.5 μm as the maximum thickness of an alternating layer, and this thick heat seal layer does not contribute to reflectance at a wavelength range of 400 to 800 nm and is distinguished from the alternating first and second layers. A blend product of the materials of the first layers and the second layers may be used if the characteristic properties of the heat seal layer are not impaired.

[Brightness Improving Member]

The multi-layer stretched film of the present invention highly reflects the P polarization component selectively, highly transmits the S polarization component in a direction perpendicular to the above polarization component selectively and eliminates a hue shift of transmitted polarization from diagonally incident light. Therefore, it can be advantageously used as a brightness improving film for liquid crystal displays and may be processed into a brightness improving member. Since it has higher polarization performance than in the prior art, when it is used as a brightness improving member, a high brightness improving rate is obtained and a liquid crystal display having excellent visibility with little hue shift at a high view angle can be provided. In addition, the thickness of the film can be reduced to 40 μm or less.

[Composite Member for Liquid Crystal Displays]

Preferably, the brightness improving member produced by using the multi-layer stretched film of the present invention is used as a composite member for liquid crystal displays by further forming a light diffusing film on at least one side thereof. The brightness improving member and the light diffusing film are preferably bonded together via the heat seal layer. Although a prior art composite member consists of 800 or more layers and has a total thickness of about 100 μm, when the layer constitution of the composite member for liquid crystal displays of the present invention is employed, the total thickness of the composite member can be reduced to about 50 μm, thereby making it possible to reduce the thickness of a liquid crystal display.

A preferred example of the composite member for liquid crystal displays of the present invention has a light diffusing film on at least one side of the brightness improving member and a prism layer on the opposite side to the brightness improving member via the light diffusing film. When the composite member for liquid crystal displays has this layer constitution, as compared with the prior art composite member having 800 or more layers, a display can be made thin and brightness improving performance can be enhanced at the same time.

[Liquid Crystal Display Comprising a Brightness Improving Member]

Figure 4:
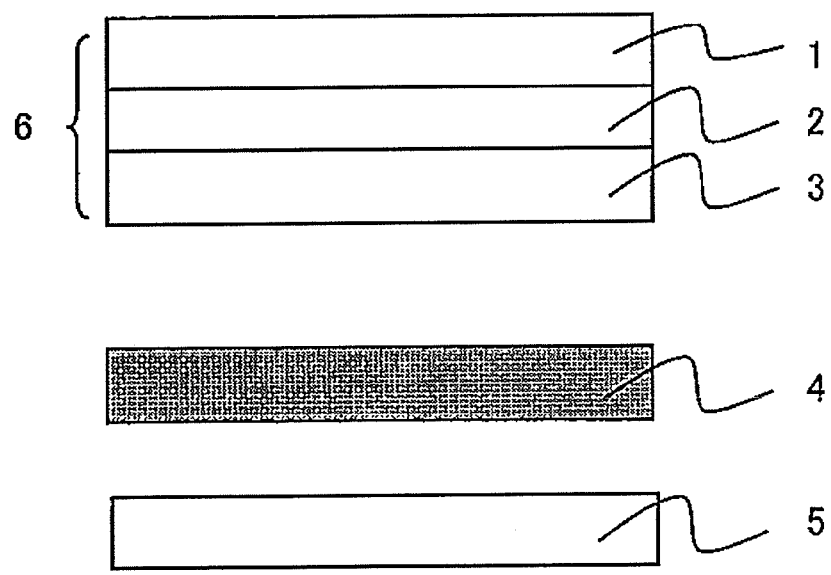
FIG. 4 is a schematic sectional view of a liquid crystal display according to a first aspect of the present invention.
1. polarizing plate
2. liquid crystal cell
3. polarizing plate
4. brightness improving member
5. light source
6. liquid crystal panel

When the multi-layer stretched film of the present invention is used as a brightness improving member, it can be used in a liquid crystal display according to the first aspect as shown in FIG. 4.

Stated more specifically, it is a liquid crystal display comprising a light source 5, a liquid crystal panel 6 composed of a polarizing plate 1, a liquid crystal cell 2 and a polarizing plate 3, and a brightness improving member 4 interposed therebetween.

[Reflection Polarizing Plate to be Laminated with a Liquid Crystal Cell]

The multi-layer stretched film of the present invention may be used as a reflection polarizing plate to be laminated with a liquid crystal cell.

Stated more specifically, out of the multi-layer stretched films of the present invention, a multi-layer stretched film having average reflectances at a wavelength of 400 to 800 nm for polarization incident at angles of 0° and 50° of the P polarization component of 95% or more respectively and average reflectances at a wavelength of 400 to 800 nm for polarization incident at angles of 0° and 50° of the S polarization component of 12% or less, respectively may be used as a reflection polarizing plate to be laminated with a liquid crystal cell.

The polarizing plate having the above reflectance characteristic has high polarizing performance equivalent to that of a prior art absorption type polarizing plate and the function of a brightness improving film which reflects untransmitted polarized light to reutilize it and eliminates a hue shift of transmitted light from diagonally incident light.

[Optical Member for Liquid Crystal Displays]

The present invention also includes an optical member for liquid crystal displays which comprises a first polarizing plate composed of the multi-layer stretched film of the present invention, a liquid crystal cell and a second polarizing plate in this order (may be referred to as "second aspect of liquid crystal display" in the present invention) as one aspect of the present invention. This optical member is also called "liquid crystal panel". The optical member is denoted by 11 in FIG. 5, the first polarizing plate by 9, the liquid crystal by 8 and the second polarizing plate by 7.

A prior art optical member has at least absorption polarizing plates as polarizing plates on both sides of the liquid crystal cell so as to obtain high polarization performance. When the multi-layer stretched film of the present invention is used as a polarizing plate, high polarization performance which cannot be achieved by a prior art multi-layer stretched film is obtained, thereby making it possible to laminate it with a liquid crystal cell in place of the prior art absorption type polarizing plate.

That is, the feature of the present invention is that a polarizing plate composed of the multi-layer stretched film of the present invention is used alone as a first polarizing plate on one side of the liquid crystal cell. A plurality of multi-layer stretched films of the present invention may be laminated together to be used as the first polarizing plate. Although the multi-layer stretched film of the present invention may be laminated with another film to be used as the first polarizing plate, preferably, a laminate consisting of the multi-layer stretched film of the present invention and an absorption type polarizing plate is excluded.

The type of the liquid crystal cell is not particularly limited and any liquid crystal cell such as VA mode, IPS mode, TN mode, STN mode or bend orientation (π type) liquid crystal cell may be used.

The type of the second polarizing plate is not particularly limited, and an absorption type polarizing plate and a reflection type polarizing plate may be used. When a reflection type polarizing plate is used as the second polarizing plate, the reflection type polarizing plate which is composed of the multi-layer stretched film of the present invention is preferably used.

The optical member for liquid crystal displays of the present invention preferably comprises a first polarizing plate, a liquid crystal cell and a second polarizing plate in this order, and these members may be directly laminated together, or a layer for enhancing adhesion between layers called "adhesive layer" or "bonding layer" (to be referred to as "adhesive layer" hereinafter), or a protective layer may be formed between these members.

[Formation of Optical Member for Liquid Crystal Displays]

To set the polarizing plate on the liquid crystal cell, both are preferably laminated together by an adhesive layer. An adhesive for forming the adhesive layer is not particularly limited but suitably selected from adhesives comprising a polymer such as acrylic polymer, silicone-based polymer, polyester, polyurethane, polyamide, polyether, or fluorine-based or rubber-based polymer as a base polymer. An acrylic adhesive which has excellent transparency, suitable wettability, cohesive property and adhesion characteristic such as adhesiveness and excellent weather resistance and heat resistance is preferred. A plurality of adhesive layers which differ in composition or type may be formed.

From the viewpoint of work efficiency for laminating the liquid crystal cell and the polarizing plate, the adhesive layer is preferably formed in advance on one or both of the polarizing plate and the liquid crystal cell. The thickness of the adhesive layer which can be suitably determined according to use purpose and adhesive force is generally 1 to 500 μm, preferably 5 to 200 μm, particularly preferably 10 to 100 μm.

[Release Film]

Preferably, a release film (separator) is provisionally attached to the exposed surface of the adhesive layer to cover the surface in order to prevent its contamination before actual use. Thereby, it is possible to prevent contact with the adhesive layer while it is handled. Examples of the release film include plastic films, rubber sheets, paper, cloth, nonwoven cloth, nets, foamed sheets, metal foils and laminates thereof. As required, the release film may be coated with a release agent such as silicone-based, long-chain alkyl-based or fluorine-based release agent, or molybdenum sulfide.

[Liquid Crystal Display Comprising a Reflection Polarizing Plate to be Laminated with a Liquid Crystal Cell]

The present invention also includes a liquid crystal display which comprises a light source and the optical member for liquid crystal displays of the present invention, wherein the first polarizing plate is arranged on the light source side as one aspect of the present invention.

Figure 5:
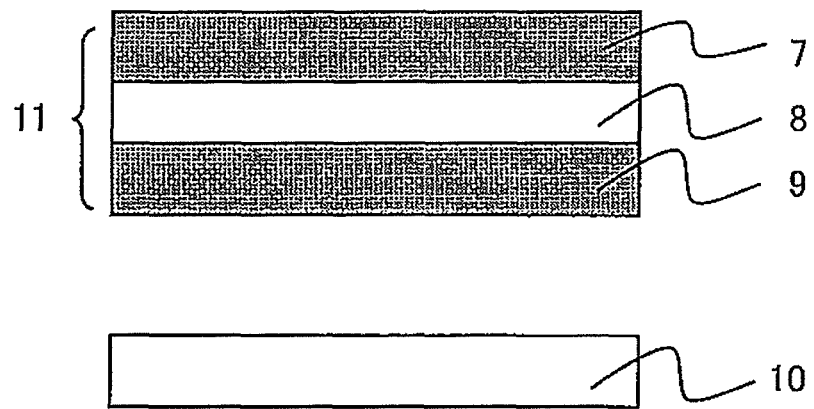
FIG. 5 is a schematic sectional view of a liquid crystal display according to a second aspect of the present invention
7. second polarizing plate
8. liquid crystal cell
9. first polartizing plate
10. light source
11. liquid crystal panel

FIG. 5 is a schematic sectional view of a liquid crystal display according to a second aspect of the present invention. The liquid crystal display has a light source 10 and a liquid crystal panel 11 and optionally a drive circuit. The liquid crystal panel 11 has a first polarizing plate 9 on the light source 10 side of the liquid crystal cell 8. It has a second polarizing plate 7 on the opposite side to the light source of the liquid crystal cell 8, that is, a viewer side. The liquid crystal cell 8 may be of any type such as VA mode, IPS mode, TN mode, STN mode or bend orientation (π type).

Since the first polarizing plate 9 which is composed of the reflection polarizing plate to be laminated with a liquid crystal cell of the present invention and has high polarization performance is arranged on the light source side of the liquid crystal cell 8 in the liquid crystal display of the present invention, it can be laminated with the liquid crystal cell in place of the prior art absorption type polarizing plate.

Since the polarizing plate of the present invention has high polarizing performance equivalent to that of the prior art absorption type polarizing plate and the function of a brightness improving film which reflects untransmitted polarized light to reutilize it, it is not necessary to use a reflection type polarizing plate called "brightness improving film" between the light source 10 and the first polarizing plate 9, and the functions of the brightness improving film and the polarizing plate to be laminated with the liquid crystal cell can be integrated with each other, thereby making it possible to reduce the number of members.

Further, since the polarizing plate of the present invention is used as the first polarizing plate in the liquid crystal display of the present invention, as for diagonally incident light, the liquid crystal display of the present invention rarely transmits the diagonally incident P polarization component and transmits the diagonally incident S polarization component at the same time by suppressing its reflection with the result that a hue shift of transmitted light from diagonally incident light is suppressed. Therefore, a color image projected by the liquid crystal display can be seen as it is.

As shown in FIG. 5, the second polarizing plate 7 is generally arranged on the viewer side of the liquid crystal cell 8. The second polarizing plate 7 is not particularly limited and a known absorption type polarizing plate may be used. When the influence of extraneous light is very small, the same reflection type polarizing plate as the first polarizing plate may be used as the second polarizing plate. An optical layer such as an optical correction film may be formed on the viewer side of the liquid crystal cell 8 besides the second polarizing plate.

[Formation of Liquid Crystal Display Comprising a Reflection Polarizing Plate to be Laminated with a Liquid Crystal Cell]

A liquid crystal display according to the second aspect of the present invention is obtained by combining the optical member (liquid crystal panel) for liquid crystal displays of the present invention with a light source and optionally a drive circuit. Although other members required to form the liquid crystal display may be used in combination, the liquid crystal display of the present invention preferably applies light from the light source to the first polarizing plate.

Light sources for liquid crystal displays are roughly divided into direct and side light types. In the liquid crystal display of the present invention, any type of light source may be used.

The liquid crystal display obtained as described above may be used for various purposes, for example, OA equipment such as personal computer monitors, notebook type PCs and copiers, portable equipment such as mobile phones, timepieces, digital cameras, personal digital assistants (PDA) and portable game machines, home electric appliances such as video cameras, TV sets and microwave ovens, car equipment such as back monitors, monitors for car navigation systems and car audios, display equipment such as information monitors for commercial shops, security equipment such as surveillance monitors, and care and medical equipment such as care monitors and medical monitors.

[Production Process of Multi-Layer Stretched Film]

A description is subsequently given of the production process of the multi-layer stretched film of the present invention.

The multi-layer stretched film of the present invention is manufactured as follows. The polyester for forming the first layers and the thermoplastic resin for forming the second layers are extruded into at least 251 layers while they are molten in such a manner that these layers are placed one upon another alternately to form a multi-layer unstretched film (step of forming a sheet-like product). At this point, 251 or more layers are laminated together to ensure that the thickness of each layer is changed stepwise or continuously to 2.0 to 5.0 times.

The multi-layer unstretched film obtained as described above is stretched in at least one (direction along the film plane) of a film forming direction and a transverse direction orthogonal to that direction. The stretching temperature is preferably (Tg) to (Tg+50)° C. (Tg is the glass transition point of the polyester of the first layers). The draw ratio at this point is preferably 2 to 10 times, more preferably 2. 5 to 7 times, much more preferably 3 to 6 times, particularly preferably 4.5 to 5.5 times. As the draw ratio becomes higher, variations in the plane direction among the first layers and among the second layers become smaller due to a thickness reduction by stretching, the optical interference of the multi-layer stretched film becomes more uniform in the plane direction, and the difference in refractive index in the stretching direction between the first layers and the second layers becomes larger advantageously. The stretching method at this point may be a conventionally known stretching method such as heat stretching with a rod-like heater, roll heat stretching or tenter stretching. From the view points of the reduction of the number of scratches formed by contact with the roll and the stretching speed, tenter stretching is preferred. When biaxial stretching is carried out by stretching in a direction (Y direction) orthogonal to the stretching direction as well, the draw ratio is preferably 1.05 to 1.20 times. When the draw ratio in the Y direction exceeds this range, polarization performance may deteriorate. After stretching, heat setting is preferably further carried out.

EXAMPLES

The following examples are provided to further illustrate the present invention. Physical properties and characteristic properties in the examples were measured or evaluated by the following methods.

(1) Melting Points (Tm) and Glass Transition Points (Tg) of Polyester and Film 10 mg of a polyester or a film was sampled to measure its melting point and glass transition point at a temperature elevation rate of 20° C/min by using DSC (tradename: DSC2920 of TA Instruments Co., Ltd.).

(2) Specification of Resin and Specification of Comonomer Components and their Amounts A resin component, comonomer components and the amount of each component for each of the layers of the film sample were specified by $^1$H-NMR measurement.

(3) Thickness of Each Layer

A film piece having a length of 2 mm and a width of 2 cm was cut out from the film sample, fixed in a capsule and embedded in an epoxy resin (Epomount of Refine Tech Co., Ltd.). The embedded sample was sliced vertically in the transverse direction by means of a microtome (ULTRACUT UCT of LEICA Co., Ltd.) to obtain a 5 nm-thick thin film. It was observed and photographed through a transmission electron microscope (S-4300 of Hitachi, Ltd.) at an acceleration voltage of 100 kV to measure the thickness of each layer from the obtained photomicrograph.

Based on the thickness of each layer, the ratio of the thickness of the maximum layer to the thickness of the minimum layer out of the first layers and the ratio of the thickness of the maximum layer to the thickness of the minimum layer out of the second layers were obtained.

Further, based on the thickness of each layer, the thickness of the average layer of the first layers and the thickness of the average layer of the second layers were obtained to calculate the ratio of the thickness of the average layer of the second layers to the thickness of the average layer of the first layers.

The outermost heat seal layer was excluded from the first layers and the second layers. When a thickness control layer having a thickness of 2 μm or more was existent in the alternating layers, this layer was also excluded from the first layers and the second layers.

(4) Total Film Thickness

The film sample was set in a spindle detector (K107C of Anritsu Corporation) to measure its thickness at 10 different points by means of a digital differential electronic micrometer (K351 of Anritsu Corporation) so as to obtain the average value of the measurement data as film thickness.

(5) Refractive Index and Average Refractive Index After Stretching in Each Direction The resin for constituting each layer was molten, extruded from a die and cast on a casting drum to prepare a cast film. The obtained film was stretched to 5 times in a uniaxial direction at 135° C. to obtain a stretched film. The refractive indices in the stretching direction (X direction), a direction (Y direction) orthogonal to the stretching direction and the thickness direction (Z direction) ($n_X$, $n_Y$ and $n_Z$, respectively) of the obtained cast film and the obtained stretched film were measured at a wavelength of 633 nm by using the prims coupler of Metricon Co., Ltd. and taken as refractive indices before and after stretching. As for the average refractive index, the average value of refractive indices before stretching is taken as average refractive index.

(6) Reflectance, Reflection Wavelength

A polarization filter was set on the light source side to measure the reflectance of a mirror surface opposite to a mirror evaporation coated with aluminum at a wavelength of 400 to 800 nm by using a spectrophotometer (MPC-3100 of Shimadzu Corporation). The measurement value obtained when the transmission axis of the polarizing filter was aligned with the stretching direction (X direction) of the film was taken as for P polarization and the measurement value obtained when the transmission axis of the polarizing filter was arranged orthogonal to the stretching direction of the film was taken as for S polarization. The average value of reflectances at a wavelength of 400 to 800 nm of these polarization components was taken as average reflectance. (7) hue (I)

Y, x and y in the CIE color system for a standard light source C in accordance with JISZ8729 were obtained from transmission spectra measured at incidence angles of 0° and 50° of the P polarization and the S polarization of the film sample. The differences (hue changes) of x and y at 0° and 50° of the P polarization and the S polarization were obtained from the following equations (1) and (2).

$$\Delta x = x(0°) - x(50°) \quad (1)$$

(In the above equation (1), x(0°) is the hue x of the transmission spectrum of polarization incident at an angle of 0°, and x(50°) is the hue x of the transmission spectrum of polarization incident at an angle of 50°.)

$$\Delta y = y(0°) - y(50°) \quad (2)$$

(In the above equation (2), y(0°) is the hue y of the transmission spectrum of polarization incident at an angle of 0°, and y(50°) is the hue y of the transmission spectrum of polarization incident at an angle of 50°.)

(8) Brightness Increase Rate (I) When Used as Brightness Improving Member

Each of the laminated film samples prepared in Examples 1 to 6 and Comparative Examples 1 to 6 (multi-layer stretched films) was inserted between a light source and a polarizing plate in an LCD panel (Diamond Crysta RDT158V-N of Mitsubishi Electric Co., Ltd. manufactured in 2004) to measure the brightness of its front surface by means of a luminance meter (BM-7) manufactured by Topcon Corporation when white color was displayed by PC at a position 500 mm away from the film sample so as to calculate the increase rate of brightness after the insertion of the film sample from brightness before the insertion of the film sample. Thus, the brightness improving effect when the film sample was used as a brightness improving member was evaluated.

(9) Heat Seal Strength

The heat seal sides of two films were joined together and pressure-bonded together at 140° C. and 275 kPa for 2 seconds, leaving a space to be pinched with a chuck, so as to prepare a laminate sample. The obtained laminate sample was slit to a width of 25 mm, the space was pinched with the chuck of the crosshead of a tensile tester (Tensilon, trade name of Toyo Baldwin Co., Ltd.), and the position of the crosshead was adjusted to eliminate a sag. The sample was pulled at a crosshead speed of 100 mm/min to be removed, and the load was measured by means of a load cell mounted so as to the tester to obtain heat seal strength (unit: N/25 mm).

(10) Brightness Improving Rate (II) and Hue (II) When Used as a Polarizing Plate to be Laminated with a Liquid Crystal Cell The liquid crystal displays manufactured in Examples 7 to 13 and Comparative Examples 7 to 13 were used as displays for personal computers, and the brightness of the front surface of the screen of each of the liquid crystal displays when white color was displayed by the personal computer was measured by means of the FPD view angle measurement and evaluation device (ErgoScope88) of Opto Design Co., Ltd. to calculate the increase rate of brightness and color as compared with those of Comparative Example 7. Thus, the brightness improving effect when the sample was used as a polarizing plate to be laminated with a liquid crystal cell was evaluated based on the following criteria.

⊚: brightness improving effect is 160% more

○: brightness improving effect is 150% or more to less than 160%

Δ: brightness improving effect is 140% or more to less than 150%

X: brightness improving effect is less than 140%

When the front surface of the screen was 0°, the maximum change of hue x or y at an omnidirectional view angle of 0 to 80° was evaluated based on the following criteria.

⊚: maximum changes of both x and y are less than 0.03

○: maximum change of any one of x and y is less than 0.03

Δ: maximum change of any one of x and y is 0.03 or more

X: maximum changes of both x and y are 0.03 or more

(11) Evaluation of Contrast When Used as a Polarizing Plate to be Laminated with a Liquid Crystal cell The liquid crystal displays manufactured in Examples 7 to 13 and Comparative Examples 7 to 13 were used as displays for personal computers, and the brightness of the front surface of the screen of each of the liquid crystal displays when white and black screens were displayed by the personal computer was measured by means of the FPD view angle measurement and evaluation device (ErgoScope88) of Opto Design Co., Ltd. so as to obtain light brightness from the white screen and dark brightness from the black screen. Contrast obtained from light brightness/dark brightness was evaluated based on the following criteria.

◎: contrast (light brightness/dark brightness) is 1,000 or more
○: contrast (light brightness/dark brightness) is 200 or more to less than 1,000
X: contrast (light brightness/dark brightness) is less than 200

Example 1

An esterification reaction or a transesterification reaction was carried out among dimethyl 2,6-naphthalenedicarboxylate, 6,6'-(ethylenedioxy)di-2-naphthoic acid and ethylene glycol in the presence of titanium tetrabutoxide, and then a polycondensation reaction was carried out to obtain an aromatic polyester (ENA35PEN) having an intrinsic viscosity of 0.62 dl/g and containing 65 mol % of a 2,6-naphthalenedicarboxylic acid component (expressed as NDC in the table) and 35 mol % of a 6,6'-(ethylenedioxy)di-2-naphthoic acid component (expressed as ENA in the table) as acid components and ethylene glycol as a glycol component. Spherical silica particles (average particle diameter: 0.3 μm, ratio of long diameter to short diameter: 1.02, average deviation of particle diameter: 0.1) were added to this aromatic polyester in an amount of 0.10 wt % based on the weight of the first layer to prepare a polyester for the first layers.

A copolyethylene terephthalate (IA20PET) containing 20 mol % of isophthalic acid and having an intrinsic viscosity (orthochlorophenol, 35° C.) of 0.62 dl/g was prepared as a thermoplastic resin for the second layers.

The polyester for the first layers and the polyester for the second layers prepared as described above were dried at 170° C. for 5 hours, supplied into first and second extruders and heated up to 300° C. to be molten. The polyester for the first layers was divided into 137 layers, the polyester for the second layers was divided into 138 layers, and a multi-layer feed block apparatus for laminating the first layers and the second layers alternately and changing the ratio of the thickness of the maximum layer to the thickness of the minimum layer in the first layers and the second layers up to 2.2 times continuously was used to obtain a molten laminate consisting of 275 alternating first and second layers. The same polyester as the polyester for the second layers was guided to a three-layer die from a third extruder while this laminated state was maintained such that it was placed on both sides of the laminate so as to form a heat seal layer on both sides of the molten laminate consisting of a total of 275 layers. The supply of the polyester into the third extruder was adjusted to ensure that the both outermost layers (heat seal layers) accounted for 18% of the total thickness. These layers were guided into a die while the laminated state was maintained and cast on a casting drum to ensure that the thickness ratio of the average layer of the second layers and the average layer of the first layers became 1.0:2.6 so as to produce a multi-layer unstretched film consisting of a total of 277 layers.

This multi-layer unstretched film was stretched to 5.2 times in the transverse direction at 135° C. and heat set at 140° C. for 3 seconds. The thickness of the obtained film was 33 μm. The resin constitution of each layer, the characteristic properties of each layer and the physical properties of the obtained multi-layer stretched film are shown in Table 2. The both sides of the obtained multi-layer stretched film were pressure bonded to the back coated side of a light diffusing film (Opulse BS-912 of Keiwa Co., Ltd.) at 140° C. and 275 kPa for 2 seconds to obtain a laminated film.

Examples 2 to 4 and 6

Multi-layer stretched films were obtained in the same manner as in Example 1 except that the resin composition or the thickness of each layer was changed as shown in Table 1. The physical properties of the obtained multi-layer stretched films are shown in Table 2. Each of the obtained multi-layer stretched films was pressure bonded to the back coated side of a light diffusing film (Opulse BS-912 of Keiwa Co., Ltd.) at 140° C. and 275 kPa for 2 seconds to obtain a laminated film.

NDC20PET used as the polyester for the second layers in Example 2 is a copolyester obtained by changing the comonomer component of polyethylene terephthalate (IA20PET) containing 20 mol % of isophthalic acid used as the polyester for the second layers in Example 1 to 2,6-naphthalenedicarboxylic acid (NDC).

The ENA21PEN/PCT blend used as the polyester for the second layer in Example 4 is a mixture of ENA21PEN (aromatic polyester containing 79 mol % of a 2,6-naphthalenedicarboxylic acid component and 21 mol % of a 6,6'-(ethylenedioxy)di-2-naphthoic acid component as acid components and ethylene glycol as a glycol component) which is the polyester for the first layers in Example 4 and PCTA AN004 of Eastman Chemical Co., Ltd. (copolymer of polycyclohexane dimethylene terephthalate and isophthalate) in a weight ratio of 2:1.

Example 5

A multi-layer stretched film was prepared in the same manner as in Example 1 except that the copolymerization ratio of the polyester for the first layers was changed as shown in Table 1 and the thickness of each layer was changed as shown in Table 1. The resin constitution of each layer and the characteristic properties of each layer of the obtained multi-layer stretched film are shown in Table 1, and the physical properties of the film are shown in Table 2.

The back coated side of a light diffusion film (Opulse BS-912 of Keiwa Co., Ltd.) was placed on one side of the obtained multi-layer stretched film, the back coated side of a prism sheet (Dia Art Y type (M268Y) of Mitsubishi Rayon Co., Ltd.) was placed on the opposite side of the film, and the obtained assembly was pressure bonded at 140° C. and 275 kPa for 2 seconds to obtain a laminated film. When the brightness improving effect was measured by using the obtained laminated film, it was 210%.

The compositions of the polyesters in Table 1 are as follows.

|  | Dicarboxylic acid component | | Diol Component |
|---|---|---|---|
|  | component/mol % | component/mol % | component/mol % |
| ENA35PEN | ENA/35 | NDC/65 | EG/100 |
| ENA12PEN | ENA/12 | NDC/88 | EG/100 |
| ENA21PEN | ENA/21 | NDC/79 | EG/100 |
| PEN | ENA/0 | NDC/100 | EG/100 |
| ENA3PEN | ENA/3 | NDC/97 | EG/100 |
| ENA70PEN | ENA/70 | NDC/30 | EG/100 |
| IA20PET | IA/20 | TA/80 | EG/100 |
| NDC20PET | NDC/20 | TA/80 | EG/100 |
| TA64PEN | TA/64 | NDC/36 | EG/100 |

NDC: 2,6-naphthalenedicarboxylic acid
ENA: 6,6'-(ethylenedioxy)di-2-naphthoic acid
EG: ethylene glycol
IA: isophthalic acid
TA: terephthalic acid
PEN: polyethylene-2,6-naphthalene dicarboxylate
PET: polyethylene terephthalate Comparative Example 1

A multi-layer stretched film was obtained in the same manner as in Example 1 except that polyethylene-2,6-naphthalene dicarboxylate (PEN) having an intrinsic viscosity (orthochlorophenol, 35° C.) of 0.62 dl/g was used as the polyester for the first layers, copolyethylene-2,6-naphthalene dicarboxylate (TA64PEN) comprising 64 mol % of terephthalic acid and having an intrinsic viscosity (orthochlorophenol, 35° C.) of 0.62 dl/g was used as the thermoplastic resin for the second layers, and the production conditions were changed as shown in Table 1. The resin constitution of each layer and the characteristic properties of each layer of the obtained multi-layer stretched film are shown in Table 1, and the physical properties of the film are shown in Table 2.

The obtained multi-layer stretched film had average reflectances for S polarization at each incident angles of 0° and 50° of more than 15%, which means that polarization performance is lower than those of Examples. The hue change Δx of the P polarization was larger than those of Examples and therefore, a hue shift occurred.

Comparative Example 2 to 6

Multi-layer stretched films were obtained in the same manner as in Example 1 except that any one of the resin composition, layer thickness and production conditions was changed as shown in Table 1. The resin constitution of each layer and the characteristic properties of each layer of each of the obtained multi-layer stretched films are shown in Table 1, and the physical properties of the films are shown in Table 2. All of the obtained films were inferior to the films of Examples in polarization performance. The hue change of the P polarization or the S polarization was large and therefore, a hue shift occurred.

TABLE 1

| | First layers | | | Second layers | | | Number of optical interference layers | Thickness Total thickness [um] | Thickness of heat seal layer [um] | Thickness of optical interference layer [um] | Layer thickness ratio (second layer/first layer) |
|---|---|---|---|---|---|---|---|---|---|---|---|
| | Resin | Melting point (° C.) | Number of layers | Resin | Melting point (° C.) | Number of layers | | | | | |
| Ex. 1 | ENA35PEN | 204 | 137 | IA20PET | — | 138 | 275 | 33 | 3/3 | 27 | 2.6 |
| Ex. 2 | ENA12PEN | 247 | 137 | NDC20PET | — | 138 | 275 | 33 | 3/3 | 27 | 2.6 |
| Ex. 3 | ENA21PEN | 230 | 137 | IA20PET | — | 138 | 275 | 33 | 3/3 | 27 | 2.6 |
| Ex. 4 | ENA21PEN | 230 | 137 | ENA21PEN/PCT Blend | — | 138 | 275 | 33 | 3/3 | 27 | 2.6 |
| Ex. 5 | ENA21PEN | 230 | 137 | IA20PET | — | 138 | 275 | 33 | 3/3 | 27 | 1.0 |
| Ex. 6 | ENA21PEN | 230 | 137 | IA20PET | — | 138 | 275 | 33 | 3/3 | 27 | 6.0 |
| C. Ex. 1 | PEN | 269 | 137 | TA64PEN | — | 138 | 275 | 33 | 3/3 | 27 | 2.6 |
| C. Ex. 2 | ENA3PEN | 263 | 137 | IA20PET | — | 138 | 275 | 33 | 3/3 | 27 | 2.6 |
| C. Ex. 3 | ENA70PEN | 267 | 137 | IA20PET | — | 138 | 275 | 33 | 3/3 | 27 | 2.6 |
| C. Ex. 4 | PEN | 269 | 137 | IA20PET | — | 138 | 275 | 33 | 3/3 | 27 | 2.6 |
| C. Ex. 5 | ENA21PEN | 230 | 137 | IA20PET | — | 138 | 275 | 33 | 3/3 | 27 | 2.6 |
| C. Ex. 6 | ENA21PEN | 230 | 137 | IA20PET | — | 138 | 275 | 33 | 3/3 | 27 | 2.6 |

| | Thickness First layers | | | Thickness Second layer | | | Stretching in film forming direction | | Stretching in transverse direction | | Heat setting |
|---|---|---|---|---|---|---|---|---|---|---|---|
| | Minimum thickness [nm] | Maximum thickness [nm] | Maximum/ Minimum | Minimum thickness [nm] | Maximum thickness [nm] | Maximum/ Minimum | Draw ratio | Temperature (° C.) | Draw ratio | Temperature (° C.) | Temperature (° C.) |
| Ex. 1 | 34 | 75 | 2.2 | 89 | 195 | 2.2 | 1.0 | — | 5.2 | 135 | 120 |
| Ex. 2 | 34 | 75 | 2.2 | 89 | 195 | 2.2 | 1.0 | — | 5.2 | 135 | 120 |
| Ex. 3 | 34 | 75 | 2.2 | 89 | 195 | 2.2 | 1.0 | — | 5.2 | 135 | 120 |
| Ex. 4 | 34 | 75 | 2.2 | 89 | 195 | 2.2 | 1.0 | — | 5.2 | 135 | 120 |
| Ex. 5 | 49 | 147 | 3.0 | 49 | 147 | 3.0 | 1.0 | — | 5.2 | 135 | 120 |
| Ex. 6 | 14 | 42 | 3.0 | 84 | 252 | 3.0 | 1.0 | — | 5.2 | 135 | 120 |
| C. Ex. 1 | 27 | 82 | 3.0 | 71 | 213 | 3.0 | 1.0 | — | 5.2 | 135 | 150 |
| C. Ex. 2 | 27 | 82 | 3.0 | 71 | 213 | 3.0 | 1.0 | — | 5.1 | 135 | 120 |
| C. Ex. 3 | 44 | 65 | 1.5 | 113 | 170 | 1.5 | 1.0 | — | 5.1 | 135 | 120 |
| C. Ex. 4 | 27 | 82 | 3.0 | 71 | 213 | 3.0 | 1.0 | — | 5.1 | 135 | 120 |
| C. Ex. 5 | 47 | 62 | 1.3 | 123 | 160 | 1.3 | 1.3 | — | 5.2 | 135 | 120 |
| C. Ex. 6 | 16 | 94 | 6.0 | 41 | 243 | 6.0 | 1.3 | — | 5.2 | 135 | 120 |

Ex.: Example
C. Ex.: Comparative Example

TABLE 2

| | Polymer for first layers Refractive index after uniaxial stretching | | | Polymer for second layers | | | | | | |
|---|---|---|---|---|---|---|---|---|---|---|
| | | | | Refractive index before uniaxial stretching | | | Average refractive index | refractive index after uniaxial stretching | | |
| | $n_x$ | $n_y$ | $n_z$ | $n_x$ | $n_y$ | $n_z$ | | $n_x$ | $n_y$ | $n_z$ |
| Ex. 1 | 1.83 | 1.58 | 1.57 | 1.58 | 1.58 | 1.58 | 1.58 | 1.58 | 1.58 | 1.58 |
| Ex. 2 | 1.88 | 1.60 | 1.55 | 1.60 | 1.60 | 1.60 | 1.60 | 1.60 | 1.60 | 1.60 |
| Ex. 3 | 1.83 | 1.58 | 1.57 | 1.58 | 1.58 | 1.58 | 1.58 | 1.58 | 1.58 | 1.58 |
| Ex. 4 | 1.83 | 1.58 | 1.57 | 1.58 | 1.58 | 1.58 | 1.58 | 1.58 | 1.58 | 1.58 |
| Ex. 5 | 1.83 | 1.58 | 1.57 | 1.58 | 1.58 | 1.58 | 1.58 | 1.58 | 1.58 | 1.58 |
| Ex. 6 | 1.83 | 1.58 | 1.57 | 1.58 | 1.58 | 1.58 | 1.58 | 1.58 | 1.58 | 1.58 |
| C. Ex. 1 | 1.80 | 1.63 | 1.52 | 1.63 | 1.63 | 1.63 | 1.63 | 1.63 | 1.63 | 1.63 |
| C. Ex. 2 | 1.82 | 1.63 | 1.52 | 1.58 | 1.58 | 1.58 | 1.58 | 1.58 | 1.58 | 1.58 |
| C. Ex. 3 | 1.75 | 1.62 | 1.55 | 1.58 | 1.58 | 1.58 | 1.58 | 1.58 | 1.58 | 1.58 |
| C. Ex. 4 | 1.80 | 1.63 | 1.52 | 1.58 | 1.58 | 1.58 | 1.58 | 1.58 | 1.58 | 1.58 |
| C. Ex. 5 | 1.75 | 1.62 | 1.55 | 1.58 | 1.58 | 1.58 | 1.58 | 1.58 | 1.58 | 1.58 |
| C. Ex. 6 | 1.75 | 1.62 | 1.55 | 1.58 | 1.58 | 1.58 | 1.58 | 1.58 | 1.58 | 1.58 |

| | Optical properties at an incident angle of 0° | | | | | | | |
|---|---|---|---|---|---|---|---|---|
| | Average reflectance | | Hue (I) | | | | | |
| | P polarization component | S polarization component | P polarization component | | | S polarization component | | |
| | [%] | [%] | Y | x | y | Y | x | y |
| Example 1 | 99.0 | 10.8 | 0.5 | 0.231 | 0.297 | 89.0 | 0.312 | 0.316 |
| Example 2 | 98.9 | 11.0 | 0.8 | 0.230 | 0.299 | 88.9 | 0.311 | 0.316 |
| Example 3 | 99.1 | 10.9 | 0.6 | 0.231 | 0.297 | 89.1 | 0.312 | 0.317 |
| Example 4 | 99.0 | 10.8 | 0.6 | 0.231 | 0.297 | 89.1 | 0.312 | 0.317 |
| Example 5 | 98.0 | 10.9 | 1.0 | 0.254 | 0.297 | 89.1 | 0.312 | 0.316 |
| Example 6 | 95.5 | 10.8 | 2.8 | 0.243 | 0.301 | 88.9 | 0.312 | 0.316 |
| Comparative Example 1 | 94.0 | 15.8 | 4.8 | 0.448 | 0.392 | 84.8 | 0.314 | 0.325 |
| Comparative Example 2 | 85.0 | 32.0 | 35.2 | 0.502 | 0.452 | 82.4 | 0.201 | 0.321 |
| Comparative Example 3 | 68.2 | 18.6 | 15.2 | 0.520 | 0.456 | 60.8 | 0.452 | 0.251 |
| Comparative Example 4 | 88.2 | 24.0 | 6.0 | 0.451 | 0.400 | 73.0 | 0.650 | 0.202 |
| Comparative Example 5 | 58.0 | 10.9 | 5.1 | 0.246 | 0.316 | 89.1 | 0.312 | 0.317 |
| Comparative Example 6 | 88.0 | 10.7 | 3.2 | 0.302 | 0.297 | 89.1 | 0.312 | 0.317 |

| | Optical properties at an incident angle of 50° | | | | | | | |
|---|---|---|---|---|---|---|---|---|
| | Average reflectance | | Hue (I) | | | | | |
| | P polarization component | S polarization component | P polarization component | | | S polarization component | | |
| | [%] | [%] | Y | x | y | Y | x | y |
| Example 1 | 97.0 | 8.9 | 0.5 | 0.309 | 0.359 | 91.6 | 0.312 | 0.317 |
| Example 2 | 96.0 | 8.8 | 0.9 | 0.307 | 0.356 | 91.4 | 0.312 | 0.317 |
| Example 3 | 96.2 | 8.9 | 0.5 | 0.309 | 0.359 | 91.6 | 0.312 | 0.317 |
| Example 4 | 96.1 | 9.0 | 0.5 | 0.309 | 0.359 | 91.6 | 0.312 | 0.317 |
| Example 5 | 96.3 | 8.9 | 0.9 | 0.324 | 0.361 | 90.1 | 0.310 | 0.316 |
| Example 6 | 96.0 | 8.8 | 2.6 | 0.331 | 0.370 | 89.6 | 0.311 | 0.316 |
| Comparative Example 1 | 94.0 | 15.8 | 1.3 | 0.347 | 0.294 | 81.4 | 0.314 | 0.318 |
| Comparative Example 2 | 85.0 | 32.0 | 38.2 | 0.670 | 0.480 | 79.3 | 0.250 | 0.301 |
| Comparative Example 3 | 68.2 | 18.6 | 16.3 | 0.401 | 0.505 | 56.5 | 0.301 | 0.341 |
| Comparative Example 4 | 88.2 | 24.0 | 3.1 | 0.356 | 0.301 | 70.1 | 0.533 | 0.290 |
| Comparative Example 5 | 68.1 | 9.5 | 6.1 | 0.139 | 0.067 | 91.6 | 0.312 | 0.317 |
| Comparative Example 6 | 95.1 | 9.6 | 1.3 | 0.347 | 0.294 | 91.6 | 0.312 | 0.317 |

TABLE 2-continued

| | Hue change | | | | Heat seal strength [N/25 mm] | Brightness improving rate (I) [%] |
| --- | --- | --- | --- | --- | --- | --- |
| | Δx | Δy | Δx | Δy | | |
| | P polarization component | | S polarization component | | | |
| Example 1 | −0.079 | −0.062 | 0.000 | −0.001 | 16.2 | 161% |
| Example 2 | −0.077 | −0.057 | −0.001 | −0.001 | 14.1 | 160% |
| Example 3 | −0.079 | −0.062 | 0.000 | 0.000 | 16.2 | 162% |
| Example 4 | −0.079 | −0.062 | 0.000 | 0.000 | 15.2 | 162% |
| Example 5 | −0.070 | −0.064 | 0.002 | 0.000 | 13.1 | 158% |
| Example 6 | −0.088 | −0.069 | 0.001 | 0.000 | 15.1 | 151% |
| Comparative Example 1 | 0.101 | 0.098 | −0.001 | 0.007 | Not bonded | 140% |
| Comparative Example 2 | −0.168 | −0.028 | −0.049 | 0.020 | 15.2 | 120% |
| Comparative Example 3 | 0.119 | −0.049 | 0.151 | −0.090 | 15.6 | 105% |
| Comparative Example 4 | 0.095 | 0.099 | 0.117 | −0.088 | 16.2 | 123% |
| Comparative Example 5 | 0.107 | 0.249 | 0.000 | 0.000 | 15.5 | 120% |
| Comparative Example 6 | −0.045 | 0.002 | 0.000 | 0.000 | 15.6 | 145% |

Comparative Example 7

(Preparation of Polarizer)

A polymer film comprising polyvinyl alcohol as the main component [9P75R (thickness: 75 μm, average polymerization degree: 2,400, degree of saponification: 99.9 mol %) of Kuraray Co., Ltd.] was stretched between rolls which differed in speed and carried while it was dyed. First, the polyvinyl alcohol film was immersed in a 30° C. water bath for 1 minute to be swollen, stretched to 1.2 times in the conveyance direction and then to 3 times based on an unstretched film (original length) in the conveyance direction while it was immersed in an aqueous solution containing 0.03 wt % of potassium iodide and 0.3 wt % of iodine at 30° C. for 1 minute to be dyed. Then, it was stretched to 6 times based on the original length in the conveyance direction while it was immersed in an aqueous solution containing 4 wt % of boric acid and 5 wt % of potassium iodide at 60° C. for 30 seconds. Thereafter, the obtained stretched film was dried at 70° C. for 2 minutes to obtain a polarizer. The polarizer had a thickness of 30 μm and a moisture percentage of 14.3 wt %.

(Preparation of Adhesive)

100 parts by weight of polyvinyl alcohol-based resin having an acetoacetyl group (average polymerization degree of 1,200, degree of saponification of 98.5%, acetoacetylation degree of 5 mol %) and 50 parts by weight of methylol melamine were dissolved in pure water at 30° C. to prepare an aqueous solution having a solids content of 3.7 wt %. 18 parts by weight of an aqueous solution having a solid content of alumina colloid (average particle diameter of 15 nm) having positive charge of 10 wt % was added to 100 parts by weight of this aqueous solution to prepare an adhesive aqueous solution. The adhesive aqueous solution had a viscosity of 9.6 mPa·s and a pH of 4 to 4.5, and the amount of the alumina colloid was 74 parts by weight based on 100 parts by weight of the polyvinyl alcohol-based resin.

(Preparation of Absorption Type Polarizing Plate)

The above alumina colloid-containing adhesive was applied to one side of an optically isotropic element having a thickness of 80 μm, a front-side retardation of 0.1 nm and a thickness-direction retardation of 1.0 nm (Fujitac ZRF80S of Fuji Film Co., Ltd.) to a thickness after drying of 80 nm, and this element was laminated on one side of the above polarizer by a roll-to-roll method in such a manner that their conveyance directions became parallel to each other. Subsequently, the above alumina colloid-containing adhesive was applied to the opposite side of an optically isotropic element (Fujitac ZRF80S of Fuji Film Co., Ltd.) to a thickness after drying of 80 nm, and this element was laminated on the other side of the polarizer by the roll-to-roll method in such a manner that their conveyance directions became parallel to each other. Then, the resulting laminate was dried at 55° C. for 6 minutes to obtain a polarizing plate. This polarizing plate is designated as "polarizing plate X".

(Preparation of Liquid Crystal Panel)

A liquid crystal panel was taken out from a liquid crystal TV which comprises an IPS mode liquid crystal cell and a direct type back light (Viera TH-32LZ80 of Matsushita Electric Industrial Co., Ltd., manufactured in 2007), a polarizing plate and an optical correction film arranged above and below the liquid crystal cell were removed, and the glass surfaces (front and rear sides) of the liquid crystal cell were cleaned. Subsequently, the above polarizing plate X was placed on the front surface on the light source side of the above liquid crystal cell via an acrylic adhesive in the same direction as the absorption axis direction of the polarizing plate on the light source side arranged in the original liquid crystal panel.

Then, the above polarizing plate X was placed on the front surface on the viewer side of the liquid crystal cell via an acrylic adhesive in the same direction as the absorption axis direction of the polarizing plate on the viewer side arranged in the original liquid crystal panel. Thus, a liquid crystal panel having the polarizing plate X on one main surface of the liquid crystal cell and the polarizing plate X on the other main surface was obtained.

(Preparation of Liquid Crystal Display)

The above liquid crystal panel was set in the original liquid crystal display, and the light source of the liquid crystal display was turned on to display a white screen and a black screen by a personal computer so as to evaluate the brightness, hue and contrast of the liquid crystal display (measurement methods (10) and (11)). The physical properties of the liquid crystal display obtained as described above are shown in Table 3.

Examples 7 to 12

(Formation of Liquid Crystal Panel)

Liquid crystal panels having the obtained multi-layer stretched film (first polarizing plate) on the main surface on the light source side of a liquid crystal cell and the polarizing plate X (second polarizing plate) on the main surface on the viewer side of the liquid crystal cell were obtained in the same manner as in Comparative Example 7 except that multi-layer stretched films obtained in Examples 1 to 6 were used in place of the polarizing plate X as the first polarizing plate on the light source side, respectively.

(Preparation of Liquid Crystal Display)

Each of the above liquid crystal panels was set in the original liquid crystal display, and the light source of the liquid crystal display was turned on to evaluate the brightnesses, hues and contracts of a white screen and a black screen displayed by a personal computer (measurement methods (10) and (11)). The physical properties of the obtained liquid crystal displays are shown in Table 3.

Example 13

The operation of Example 7 was repeated expect that three multi-layer stretched films obtained in Example 1 were joined together in parallel and used as the first polarizing plate.

Comparative Examples 8 to 13

Liquid crystal panels were formed by using the multi-layer stretched films obtained in Comparative Examples 1 to 6 as the first polarizing plate to manufacture liquid crystal displays.

The obtained films were inferior in polarization performance to the films of Examples, whereby a sufficiently high brightness improving rate could not be obtained. The change of at least one of hues x and y was larger than those of Examples.

TABLE 3

| | First polarizing plate | Brightness improving rate (II) | Hue (II) | Contrast |
|---|---|---|---|---|
| Ex. 7 | One multi-layer stretched film of Example 1 | ○ | ○ | ○ |
| Ex. 8 | One multi-layer stretched film of Example 2 | ○ | ○ | ○ |
| Ex. 9 | One multi-layer stretched film of Example 3 | ○ | ○ | ○ |
| Ex. 10 | One multi-layer stretched film of Example 4 | ⊙ | ○ | ○ |
| Ex. 11 | One multi-layer stretched film of Example 5 | ○ | ○ | ○ |
| Ex. 12 | One multi-layer stretched film of Example 6 | ○ | ○ | ○ |
| Ex. 13 | Three multi-layer stretched films of Example 1 | ○ | ○ | ⊙ |
| C. Ex. 7 | Polarizing plate X | X | ○ | ⊙ |
| C. Ex. 8 | One multi-layer stretched film of Comparative Example 1 | Δ | X | X |
| C. Ex. 9 | One multi-layer stretched film of Comparative Example 2 | X | Δ | X |
| C. Ex. 10 | One multi-layer stretched film of Comparative Example 3 | X | Δ | X |
| C. Ex. 11 | One multi-layer stretched film of Comparative Example 4 | X | X | X |
| C. Ex. 12 | One multi-layer stretched film of Comparative Example 5 | X | X | X |
| C. Ex. 13 | One multi-layer stretched film of Comparative Example 6 | Δ | Δ | X |

Ex.: Example
C. Ex.: Comparative Example

Effect of the Invention

The multi-layer stretched film of the present invention eliminates a hue shift of transmitted polarization caused by the diagonal angle of incidence which is seen in a prior art reflection polarization film and has higher polarization performance than in the prior art. Therefore, when it is used as a brightness improving film or a polarizing plate to be laminated with a liquid crystal cell, a high brightness improving rate is obtained and a liquid crystal display having excellent visibility with little hue shift at a high view angle can be provided.

Industrial Applicability

The multi-layer stretched film of the present invention can be used as a brightness improving film or a polarizing plate to be laminated with a liquid crystal cell and in a liquid crystal display.

The invention claimed is:

1. A multi-layer uniaxially stretched film comprising 251 or more alternating layers which consist of first layers and second layers, wherein
   1) the first layers are layers having a thickness of 0.01 to 0.5 μm and containing a polyester comprising a dicarboxylic acid component and a diol component:
      (i) the dicarboxylic acid component contains 7 to 50 mol % of a component represented by the following formula (A) and 50 to 93 mol % of a component represented by the following formula (B):

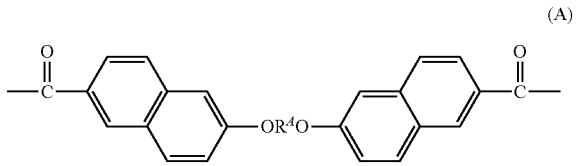

(A)

in the above formula (A), $R^A$ is an alkylene group having 2 to 10 carbon atoms;

(B)

in the above formula (B), $R^B$ is a phenylene group or naphthalenediyl group; and
      (ii) the diol component contains 90 to 100 mol % of a component represented by the following formula (C):

(C)

in the above formula (C), $R^C$ is an alkylene group having 2 to 10 carbon atoms; and the second layers are layers having a thickness of 0.01 to 0.5 μm and containing a thermoplastic resin having an average refractive index of 1.50 to 1.60 and differences in refractive index among a unidirectional stretching direction (X direction), a direction (Y direction) orthogonal to the uniaxial stretching direction within the film plane and a film thickness direction (Z direction) of 0.05 or less before and after stretching;

2) the average reflectances at a wavelength of 400 to 800 nm for polarization incident at angles of 0° and 50° of a polarization component parallel to the incidence plane including the X direction with the film plane as a reflection plane are 90% or more;

3) the average reflectances at a wavelength of 400 to 800 nm for polarization incident at angles of 0° and 50° of a polarization component perpendicular to the incidence plane including the X direction with the film plane as a reflection plane are 15% or less;

4) the ratio of the thickness of the maximum layer to the thickness of the minimum layer in the first layers and the second layers is 2.0 to 5.0 respectively; and 5) the difference in refractive index in the X direction between the first layers and the second layers is 0.10 to 0.45.

2. The multi-layer uniaxially stretched film according to claim 1, wherein the acid component represented by the formula (A) is represented by the following formula (A-1):

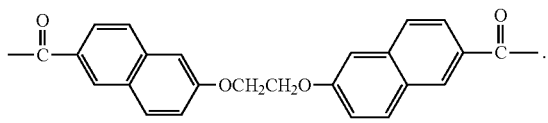

(A-1)

3. The multi-layer uniaxially stretched film according to claim 1, wherein the thermoplastic resin for forming the second layers is a polyester comprising as the main component an ethylene terephthalate component in which isophthalic acid or 2,6-naphthalenedicarboxylic acid are co-polymerized.

4. The multi-layer uniaxially stretched film according to claim 1, wherein the difference in refractive index in the Y direction between the first layers and the second layers and the difference in refractive index in the Z direction between the first layers and the second layers are 0.05 or less respectively.

5. The multi-layer uniaxially stretched film according to claim 1, wherein the hue changes Δx and Δy represented by the following equations (1) and (2) of a polarization component parallel to the incidence plane are 0.1 or less.

$$\Delta x = x(0°) - x(50°) \tag{1}$$

in the above equation (1), x(0°) is the hue x of the transmission spectrum of polarization incident at an angle of 0°, and x(50°) is the hue x of the transmission spectrum of polarization incident at an angle of 50°;

$$\Delta y = y(0°) - y(50°) \tag{2}$$

in the above equation (2), y(0°) is the hue y of the transmission spectrum of polarization incident at an angle of 0°, and y(50°) is the hue y of the transmission spectrum of polarization incident at an angle of 50°.

6. The multi-layer uniaxially stretched film according to claim 1, wherein the hue changes Δx and Δy represented by the following equations (1) and (2) of a polarization component perpendicular to the incidence plane are 0.01 or less.

$$\Delta x = x(0°) - x(50°) \tag{1}$$

in the above equation (1), x(0°) is the hue x of the transmission spectrum of polarization incident at an angle of 0°, and x(50°) is the hue x of the transmission spectrum of polarization incident at an angle of 50°;

$$\Delta y = y(0°) - y(50°) \tag{2}$$

in the above equation (2), y(0°) is the hue y of the transmission spectrum of polarization incident at an angle of 0°, and y(50°) is the hue y of the transmission spectrum of polarization incident at an angle of 50°.

7. The multi-layer uniaxially stretched film according to a claim 1 which has a thickness of 15 to 40 μm.

8. The multi-layer uniaxially stretched film according to claim 1, wherein the ratio of the thickness of the average layer of the second layers to the thickness of the average layer of the first layers is 1.5 to 5.0.

9. The multi-layer uniaxially stretched film according to claim 1, wherein a heat seal layer is further formed on at least one outermost layer out of the alternating first and second layers.

10. The multi-layer uniaxially stretched film according to claim 9, wherein the heat seal layer is made of the same thermoplastic resin as the second layers, the melting point of the thermoplastic resin is 20° or more lower than the melting point of the polyester of the first layers, and the heat seal layer has a thickness of 3 to 10 μm.

11. A brightness improving member which is composed of the multi-layer uniaxially stretched film of claim 1.

12. A composite member for liquid crystal displays which has a light diffusing film on at least one side of the brightness improving member of claim 11.

13. The composite member for liquid crystal displays according to claim 12, wherein a heat seal layer is interposed between a brightness improving member and a light diffusion film.

14. The composite member for liquid crystal displays according to claim 12 which further has a prism layer on the opposite side to the brightness improving member via the light diffusion film.

15. A liquid crystal display comprising the brightness improving member of claim 11.

16. A liquid crystal display comprising the composite member for liquid crystal displays of claim 12.

17. A polarizing plate which is composed of the multi-layer uniaxially stretched film of claim 1.

18. The polarizing plate according to claim 17, wherein the multi-layer uniaxially stretched film has (1) average reflectances at a wavelength of 400 to 800 nm for polarization incident at angles of 0° and 50° of a polarization component parallel to the incidence plane including the X direction with the film plane as a reflection plane of 95% or more, and (2) average reflectances at a wavelength of 400 to 800 nm for polarization incident at angles of 0° and 50° of a polarization component perpendicular to the incidence plane including the X direction with the film plane as a reflection plane of 12% or less.

19. An optical member for liquid crystal displays comprising a first polarizing plate, a liquid crystal cell and a second polarizing plate in this order, wherein the first polarizing plate is the polarizing plate of claim 17.

20. The optical member for liquid crystal displays according to claim 19, wherein the second polarizing plate is an absorption type polarizing plate.

21. An optical member for liquid crystal displays comprising a first polarizing plate, a liquid cell and a second polarizing plate in this order, wherein the polarizing plate of claim 17 is used as the first polarizing plate and the second polarizing plate.

22. A liquid crystal display comprising a light source and the optical member for liquid crystal displays of claim 19, wherein the first polarizing plate is arranged on the light source side.

23. The liquid crystal display according to claim 22 which has no reflection type polarizing plate between the light source and the first polarizing plate.

* * * * *